(12) United States Patent
Uenaka et al.

(10) Patent No.: US 7,598,981 B2
(45) Date of Patent: *Oct. 6, 2009

(54) ANTI-SHAKE APPARATUS

(75) Inventors: Yukio Uenaka, Tokyo (JP); Shuzo Seo, Saitama (JP)

(73) Assignee: Hoya Corporation, Tokyo (JP)

( * ) Notice: Subject to any disclaimer, the term of this patent is extended or adjusted under 35 U.S.C. 154(b) by 741 days.

This patent is subject to a terminal disclaimer.

(21) Appl. No.: 11/071,220

(22) Filed: Mar. 4, 2005

(65) Prior Publication Data

US 2005/0195286 A1      Sep. 8, 2005

(30) Foreign Application Priority Data

Mar. 8, 2004    (JP) ............................ P2004-064041

(51) Int. Cl.
*H04N 5/228* (2006.01)

(52) U.S. Cl. ............................ 348/208.99; 348/208.11; 348/208.5; 348/208.13; 348/208.4; 348/208.7; 359/554; 359/555; 359/556; 359/557; 396/55

(58) Field of Classification Search ............ 348/208.99, 348/52, 55, 208.7, 208.8, 208.11; 359/554–557; 396/55

See application file for complete search history.

(56) References Cited

U.S. PATENT DOCUMENTS

| | | | | |
|---|---|---|---|---|
| 5,266,988 A | * | 11/1993 | Washisu ..................... | 396/55 |
| 5,479,236 A | * | 12/1995 | Tanaka ....................... | 396/55 |
| 5,930,531 A | * | 7/1999 | Kitagawa et al. ............. | 396/55 |
| 5,932,984 A | * | 8/1999 | Murakami et al. .......... | 318/560 |

(Continued)

FOREIGN PATENT DOCUMENTS

JP          10-142647          5/1998

(Continued)

OTHER PUBLICATIONS

English Language Abstract of JP 2002-229090, Aug. 14, 2002.

(Continued)

*Primary Examiner*—David L Ometz
*Assistant Examiner*—Quang V Le
(74) *Attorney, Agent, or Firm*—Greenblum & Bernstein, P.L.C.

(57) ABSTRACT

An anti-shake apparatus comprises a movable-unit, a fixed-unit, a signal-processor, and a controller. The movable-unit has an imaging-device and is movable in first-and second-directions, supported by the fixed-unit. The fixed-unit has a horizontal-hall-element for detecting a first-location, and a vertical-hall-element for detecting a second-location. The signal-processor outputs a first-signal specifying the first-location, from output signals of the horizontal-hall-element, to a first A/D-converter of the controller, and outputs a second-signal specifying the second-location, from output signals of the vertical-hall-element, to a second A/D-converter of the controller. The controller calculates the first-location in an A/D-converting-operation for the first-signal, and the second-location in an A/D-converting-operation for the second-signal. An optimized-horizontal-current-value is calculated in an initial-adjustment-operation for adjusting a detecting-resolution in the A/D-converting-operation for the first-signal, by changing the current-value flowing through the horizontal-hall-element. Current having the optimized-horizontal-current-value, flows through the horizontal-hall-element when detecting the position of the movable unit.

15 Claims, 19 Drawing Sheets

U.S. PATENT DOCUMENTS

| | | | |
|---|---|---|---|
| 5,974,269 A | | 10/1999 | Sato et al. |
| 6,108,118 A | * | 8/2000 | Minamoto ................... 359/224 |
| 6,112,028 A | * | 8/2000 | Okada ......................... 396/55 |
| 6,603,927 B2 | * | 8/2003 | Enomoto ...................... 396/55 |
| 6,631,042 B2 | * | 10/2003 | Noguchi ...................... 359/823 |
| 6,985,176 B2 | * | 1/2006 | Noguchi ................. 348/208.11 |
| 2003/0067544 A1 | | 4/2003 | Wada |

FOREIGN PATENT DOCUMENTS

| | | |
|---|---|---|
| JP | 2002-229090 | 8/2002 |
| JP | 2003-110919 | 4/2003 |

OTHER PUBLICATIONS

English Language Abstract of JP 2003-110919, Apr. 11, 2003.
English Language Abstract of JP 10-142647, May 29, 1998.
U.S. Appl. No. 11/044,055 to Uenaka et al., filed Jan. 28, 2005.
U.S. Appl. No. 11/044,054 to Uenaka, filed Jan. 28, 2005.
U.S. Appl. No. 11/065,577 to Uenaka, filed Feb. 25, 2005.
U.S. Appl. No. 11/065,354 to Uenaka et al., filed Feb. 25, 2005.
U.S. Appl. No. 11/073,638 to Uenaka et al., filed Mar. 8, 2005.
U.S. Appl. No. 11/073,604 to Uenaka, filed Mar. 8, 2005.
U.S. Appl. No. 11/071,234 to Uenaka, filed Mar. 4, 2005.
U.S. Appl. No. 11/044,010 to Uenaka et al., filed Jan. 28, 2005.
U.S. Appl. No. 11/071,241, to Uenaka, filed Mar. 4, 2005.
U.S. Appl. No. 11/071,242 to Uenaka, filed Mar. 4, 2005.
U.S. Appl. No. 11/078,367 to Seo, filed Mar. 14, 2005.
U.S. Appl. No. 11/016,726 to Uenaka, filed Dec. 21, 2004.

* cited by examiner

ANTI-SHAKE APPARATUS

BACKGROUND OF THE INVENTION

1. Field of the Invention

The present invention relates to an anti-shake apparatus for a photographing device (apparatus), and in particular to a position-detecting apparatus for a movable unit that includes the imaging device etc., and that can be moved for correcting the hand-shake effect.

2. Description of the Related Art

An anti-shake apparatus for a photographing apparatus is proposed. The anti-shake apparatus corrects for the hand-shake effect by moving a hand-shake correcting lens or an imaging device on a plane that is perpendicular to the optical axis, corresponding to the amount of hand-shake which occurs during imaging.

Japanese unexamined patent publication (KOKAI) No. 2002-229090 discloses an anti-shake apparatus for a photographing apparatus. The anti-shake apparatus performs a moving operation of a movable unit, which includes a hand-shake correcting lens, by using a permanent magnet and a coil, and a position-detecting operation of the movable unit, by using a hall element and a permanent magnet.

However, an adjustment operation, which adjusts the output value regarding the position-detecting operation on the basis of the output signal from the magnetic-field change-detecting element, is performed by changing the value of an amplification rate in the signal-processing circuit. The value of the amplification rate can be changed by changing the value of a resistor in the signal-processing circuit, so that changing the value of the resistor needs a mechanical adjustment. Accordingly, this adjustment-operation is problem.

SUMMARY OF THE INVENTION

Therefore, an object of the present invention is to provide an apparatus which can perform the adjustment operation adjusting the output value regarding the position-detecting operation for the anti-shake apparatus, by an electrical adjustment without performing the mechanical adjustment.

According to the present invention, an anti-shake apparatus of a photographing apparatus comprises a movable unit, a fixed unit, a signal-processing unit, and a control unit.

The movable unit has one of an imaging device and a hand-shake correcting lens, and can be moved in first and second directions. The first direction is perpendicular to an optical axis of a camera lens of the photographing apparatus. The second direction is perpendicular to the optical axis and the first direction.

The fixed unit slidably supports the movable unit in both the first and second directions.

The control unit controls the movable unit, the fixed unit, and the signal-processing unit, and has first and second A/D converters.

One of the movable unit and the fixed unit has a magnetic-field change-detecting unit which has a horizontal magnetic-field change-detecting element for detecting a position of the movable unit in the first direction, as a first location, and a vertical magnetic-field change-detecting element for detecting a position of the movable unit in the second direction, as a second location.

Another of the movable unit and the fixed unit has a position-detecting magnet which is used for detecting the first and second locations and which faces the magnetic-field change-detecting unit.

The signal-processing unit outputs a first detected-position signal, which specifies the first location on the basis of output signals of the horizontal magnetic-field change-detecting element, to the first A/D converter, and outputs a second detected-position signal, which specifies the second location on the basis of output signals of the vertical magnetic-field change-detecting element, to the second A/D converter.

The control unit calculates the first location on the basis of an A/D converting operation by the first A/D converter, for the first detected-position signal, and calculates the second location on the basis of an A/D converting operation by the second A/D converter, for the second detected-position signal.

An optimized horizontal current-value is calculated in a first initial-adjustment operation, which adjusts a first detecting-resolution when the first detected-position signal is A/D converted by the first A/D converter, by changing the value of the current which flows through the input terminals of the horizontal magnetic-field change-detecting element.

Current having the optimized horizontal current-value, flows through the input terminals of the horizontal magnetic-field change-detecting element when detecting the position of the movable unit.

An optimized vertical current-value is calculated in a second initial-adjustment operation, which adjusts a second detecting-resolution when the second detected-position signal is A/D converted by the second A/D converter, by changing the value of the current which flows through the input terminals of the vertical magnetic-field change-detecting element.

Current having the optimized vertical current-value, flows through the input terminals of the vertical magnetic-field change-detecting element when detecting the position of the movable unit.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
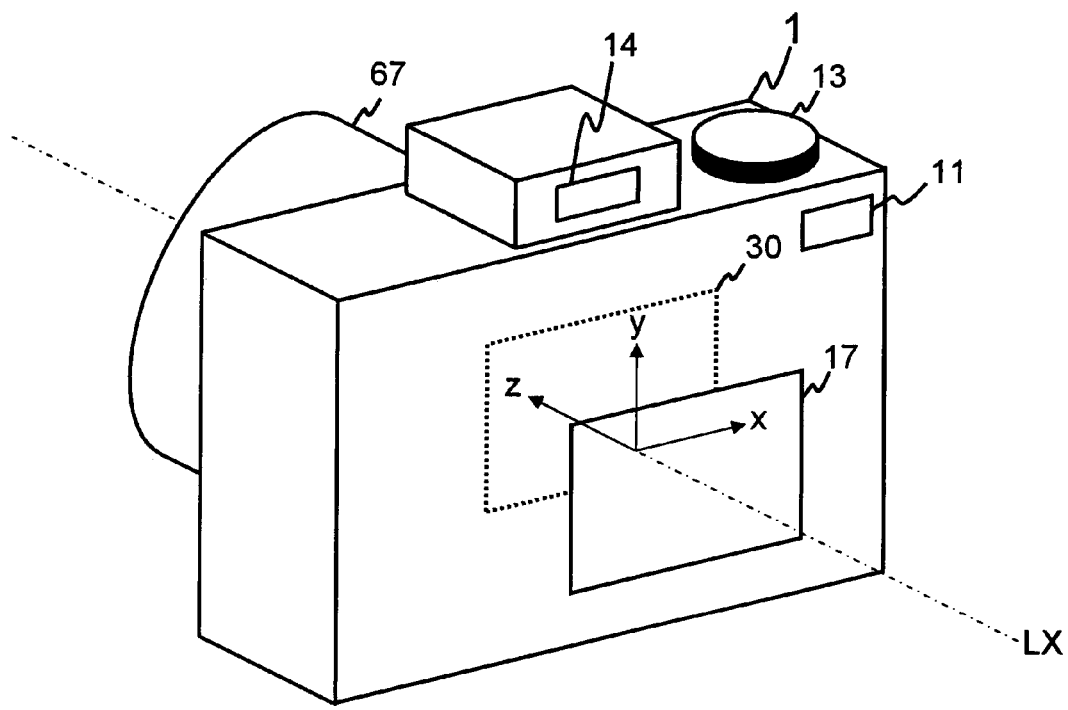
FIG. 1 is a perspective view of a photographing apparatus of the first and second embodiments viewed from the back side of the photographing apparatus.

The present invention is described below with reference to the embodiments shown in the drawings. In these embodiments, the photographing apparatus 1 is a digital camera. The photographing apparatus 1 has an optical axis LX.

In order to explain the direction in these embodiments, a first direction x, a second direction y, and a third direction z are defined (see FIG. 1). The first direction x is a horizontal direction which is perpendicular to the optical axis LX. The second direction y is a vertical direction which is perpendicular to the optical axis LX and the first direction x. The third direction z is a horizontal direction which is parallel to the optical axis LX and perpendicular to both the first direction x and the second direction y.

A first embodiment is explained by using FIGS. 1 to 14, and 19. A second embodiment is explained by using FIGS. 1, 2, 7, and 10 to 18.

Figure 4:
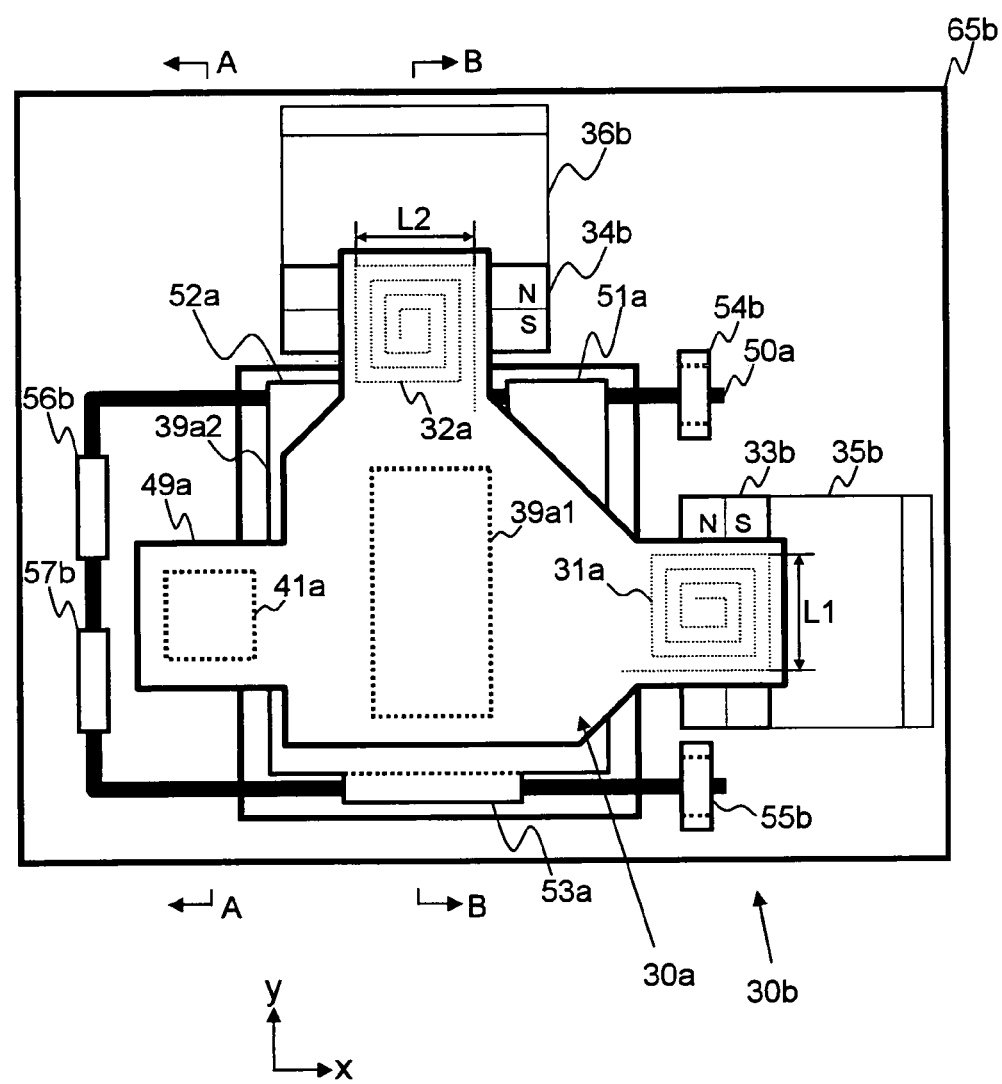
FIG. 4 is a figure showing the construction of the anti-shake unit in the first embodiment.
Figure 5:
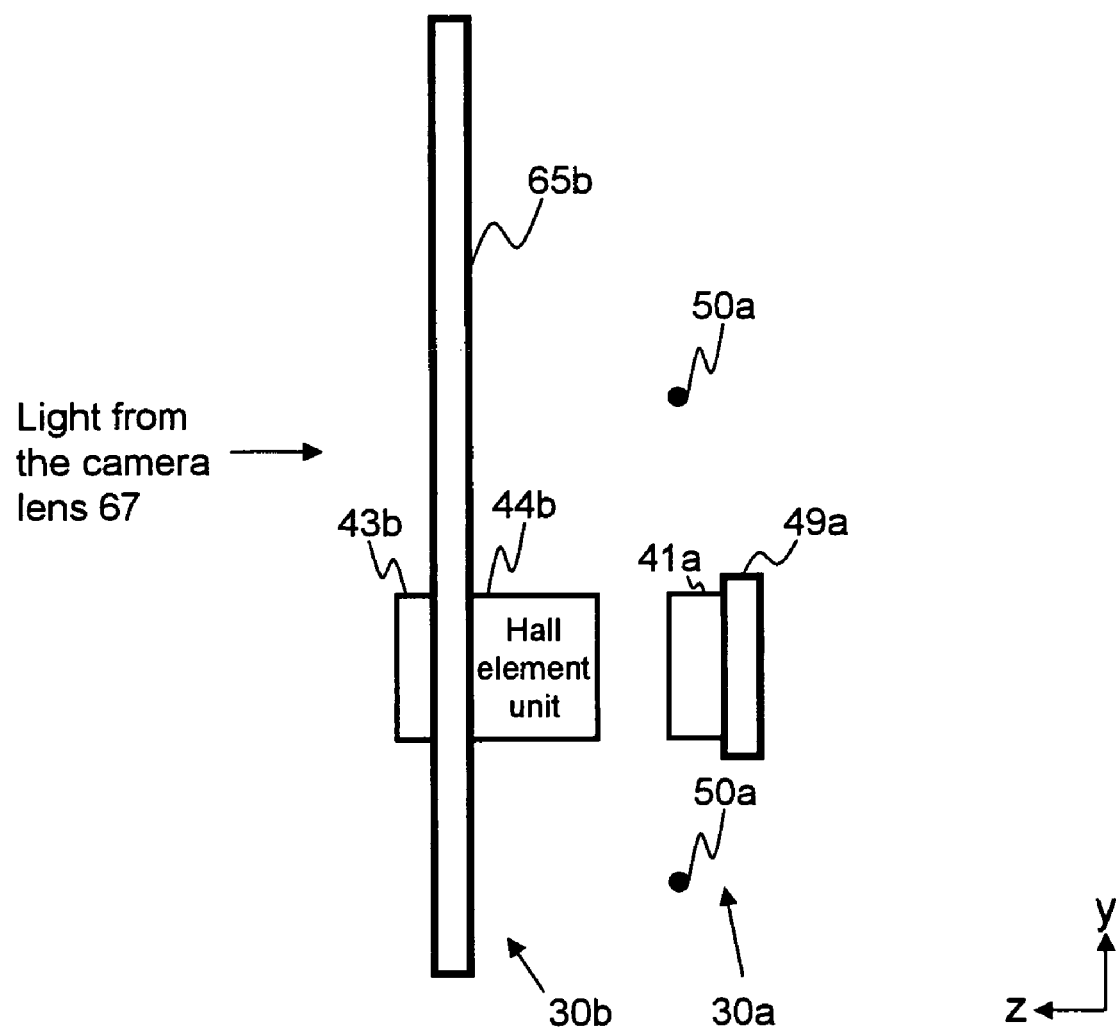
FIG. 5 is a view along line A-A of FIG. 4.
Figure 6:
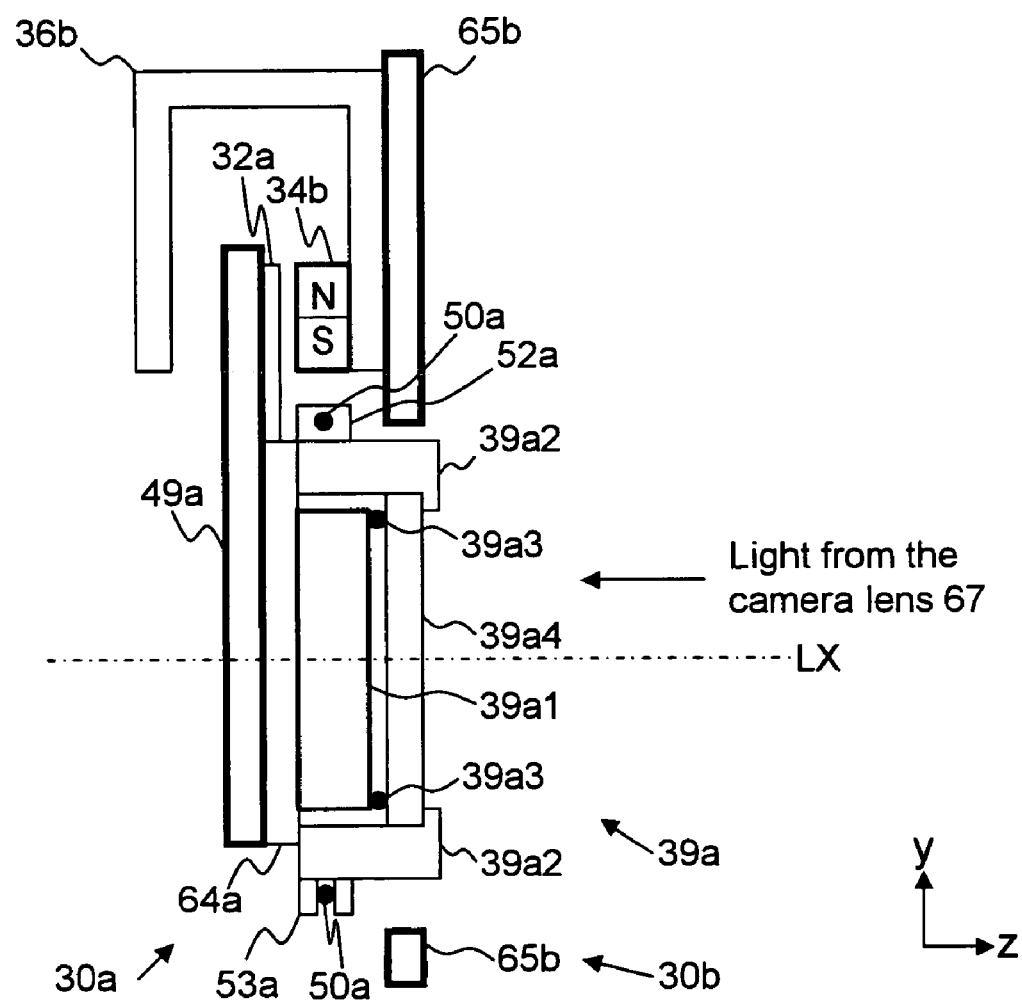
FIG. 6 is a view along line B-B of FIG. 4.

FIG. 5 shows a construction diagram of the section along line A-A of FIG. 4. FIG. 6 shows a construction diagram of the section along line B-B of FIG. 4.

Figure 2:
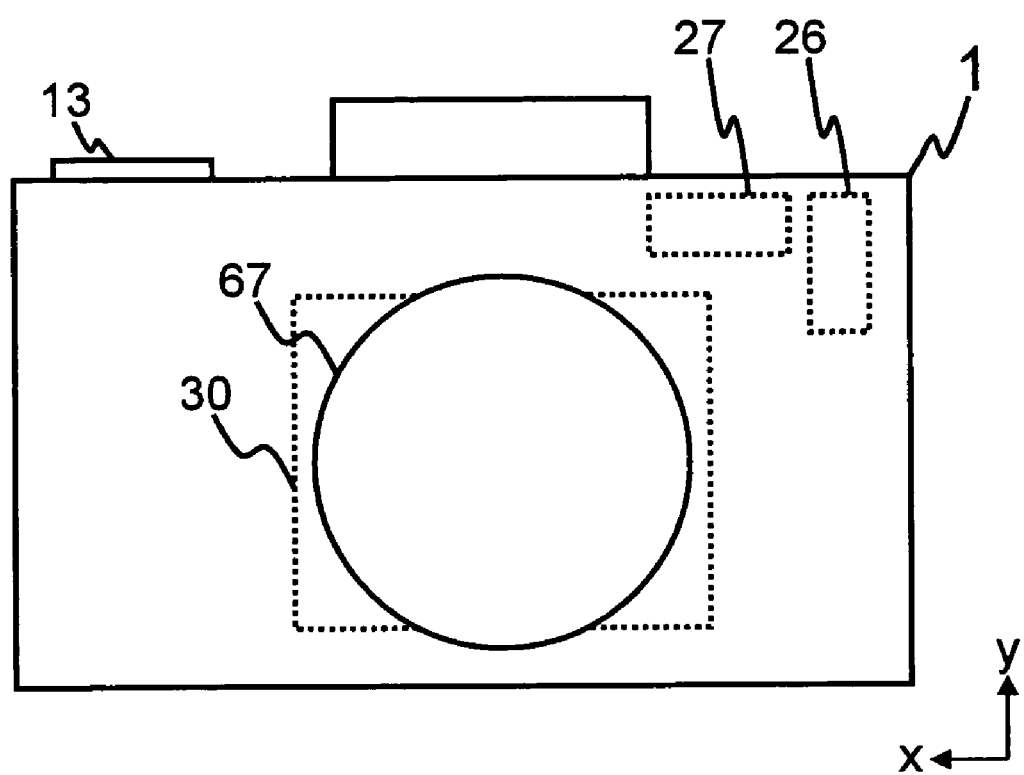
FIG. 2 is a front view of the photographing apparatus in the first and second embodiments.
Figure 3:
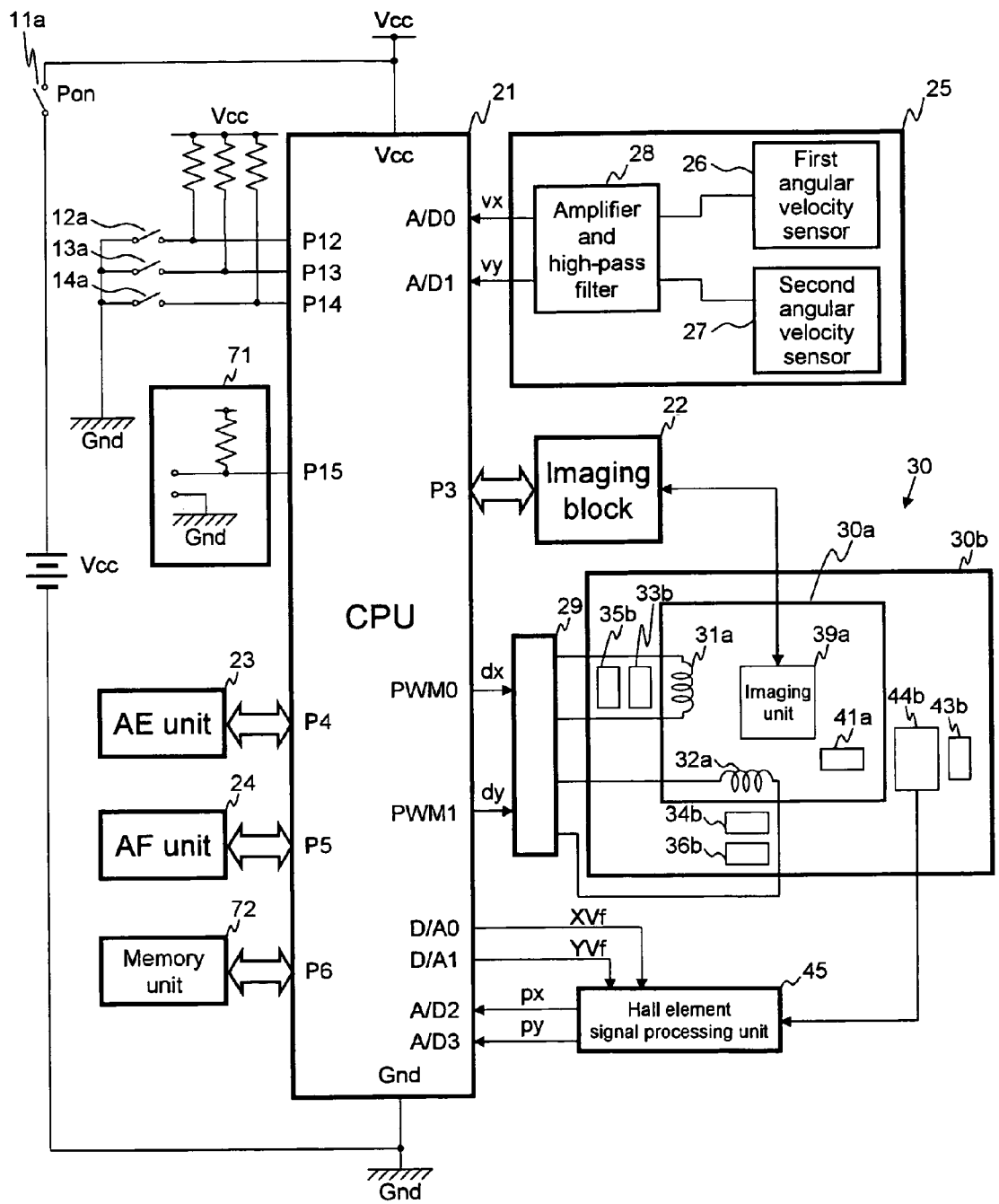
FIG. 3 is a circuit construction diagram of the photographing apparatus in the first embodiment.

The imaging part of the photographing apparatus 1 comprises a Pon button 11, a Pon switch 11a, a photometric switch 12a, a release button 13, a release switch 13a, a LCD monitor 17, a CPU 21, an imaging block 22, an AE (automatic exposure) unit 23, an AF (automatic focusing) unit 24, an imaging unit 39a in the anti-shake unit 30, and a camera lens 67 (see FIGS. 1, 2, and 3).

Whether the Pon switch 11a is in the on state or the off state, is determined by a state of the Pon button 11, so that the ON/OFF states of the photographing apparatus 1 are changed corresponding to the ON/OFF states of the Pon switch 11a.

The photographic subject image is taken as an optical image through the camera lens 67 by the imaging block 22, which drives the imaging unit 39a, so that the image, which is taken, is indicated on the LCD monitor 17. The photographic subject image can be optically observed by the optical finder (not depicted).

When the release button 13 is half pushed by the operator, the photometric switch 12a changes to the on state, so that the photometric operation, the AF sensing operation, and the focusing operation are performed.

When the release button 13 is fully pushed by the operator, the release switch 13a changes to the on state, so that the imaging operation is performed, and the image, which is taken, is stored.

The CPU 21 is a control apparatus, which controls each part of the photographing apparatus 1 regarding the imaging operation, and controls each part of the photographing apparatus 1 regarding the anti-shake operation. The anti-shake operation controls the movement of the movable unit 30a and controls detecting the position of the movable unit 30a.

The imaging block 22 drives the imaging unit 39a. The AE unit 23 performs the photometric operation for the photographic subject, calculates the photometric values, and calculates the aperture value and the time length of the exposure time, which is needed for imaging, corresponding to the photometric values. The AF unit 24 performs the AF sensing operation, and performs the focusing operation, which is needed for the imaging, corresponding to the result of the AF sensing operation. In the focusing operation, the position of the camera lens 67 is moved in the optical axis LX direction.

The anti-shaking part of the photographing apparatus 1 comprises an anti-shake button 14, an anti-shake switch 14a, a CPU 21, an angular velocity detecting unit 25, a driver circuit 29, an anti-shake unit 30, a hall-element signal-processing unit 45, the camera lens 67, an adjusting unit 71, and a memory unit 72.

When the anti-shake button 14 is fully pushed by the operator, the anti-shake switch 14a changes to the on state, so that the anti-shake operation is performed where the angular velocity detecting unit 25 and the anti-shake unit 30 are driven, at every predetermined time interval, independently of the other operations which include the photometric operation etc. When the anti-shake switch 14a is in the on state, in other words in the anti-shake mode, the parameter IS is set to 1 (IS=1). When the anti-shake switch 14a is not in the on state, in other words in the non anti-shake mode, the parameter IS is set to 0 (IS=0). In the first embodiment, the predetermined time interval is 1 ms.

The various output commands corresponding to the input signals of these switches are controlled by the CPU 21.

The information regarding whether the photometric switch 12a is in the on state or in the off state, is input to port P12 of the CPU 21 as a 1-bit digital signal. The information regarding whether the release switch 13a is in the on state or in the off state, is input to port P13 of the CPU 21 as a 1-bit digital signal. The information regarding whether the anti-shake switch 14a is in the on state or in the off state, is input to port P14 of the CPU 21 as a 1-bit digital signal.

The imaging block 22 is connected to port P3 of the CPU 21 for inputting and outputting signals. The AE unit 23 is connected to port P4 of the CPU 21 for inputting and outputting signals. The AF unit 24 is connected to port P5 of the CPU 21 for inputting and outputting signals.

The adjusting unit 71 is a mode switch for switching between a normal use mode and an adjusting mode.

In the adjusting mode, an initial-adjustment operation is performed, which adjusts a detecting-resolution in the A/D converting operation for the first and second detected-position signals px and py, which are analogue signals and are obtained when detecting the position of the movable unit 30a using the hall element unit 44b. The initial-adjustment operation has first and second initial-adjustment operations, which are described later.

When the mode switch is set to the on state, the photographing apparatus 1 is set in the adjusting mode. When the mode switch is set to the off state, the adjusting mode is canceled and the photographing apparatus 1 is set in the normal use mode.

The memory unit 72 is a non-volatile memory, such as an EEPROM etc., which stores the optimized horizontal hall-element current-value xDi and the optimized vertical hall-element current-value yDi. The memory unit 72 is electrically rewritable, so that a content, which is stored in the memory unit 72, is not deleted even if the memory unit 72 is set to the off state.

The adjusting unit 71 is connected to port P15 of the CPU 21 for inputting and outputting signals. The memory unit 72 is connected to port P6 of the CPU 21 for inputting and outputting signals.

Next, the details of the input and output relationship with the CPU 21 for the angular velocity unit 25, the driver circuit 29, the anti-shake unit 30, and the hall-element signal-processing unit 45 are explained.

The angular velocity unit 25 has a first angular velocity sensor 26, a second angular velocity sensor 27, and a combined amplifier and high-pass filter circuit 28. The first angular velocity sensor 26 detects the velocity-component in the first direction x of the angular velocity of the photographing apparatus 1, at every predetermined time interval (1 ms). The second angular velocity sensor 27 detects the velocity-component in the second direction y of the angular velocity of the photographing apparatus 1, at every predetermined time interval (1 ms).

The combined amplifier and high-pass filter circuit 28 amplifies the signal regarding the first direction x of the angular velocity (the velocity-component in the first direction x of the angular velocity), reduces a null voltage and a panning of the first angular velocity sensor 26, and outputs the analogue signal to the A/D converter A/D 0 of the CPU 21 as a first angular velocity vx.

The combined amplifier and high-pass filter circuit 28 amplifies the signal regarding the second direction y of the angular velocity (the velocity-component in the second direction y of the angular velocity), reduces a null voltage and a panning of the second angular velocity sensor 27, and outputs the analogue signal to the A/D converter A/D 1 of the CPU 21 as a second angular velocity vy.

The CPU 21 converts the first angular velocity vx which is input to the A/D converter A/D 0 and the second angular velocity vy which is input to the A/D converter A/D 1 to digital signals (A/D converting operation), and calculates the hand-shake quantity, which occurs in the predetermined time (1 ms), on the basis of the converted digital signals and the converting coefficient, where focal distance is considered. Accordingly, the CPU 21 and the angular velocity detecting unit 25 have a function which calculates the hand-shake quantity.

The CPU 21 calculates the position S of the imaging unit 39a (the movable unit 30a), which should be moved to, corresponding to the hand-shake quantity which is calculated, for the first direction x and the second direction y. The location in the first direction x of the position S is defined as sx, and the location in the second direction y of the position S is defined as sy. The movement of the movable unit 30a, which includes the imaging unit 39a, is performed by using electro-magnetic force and is described later. The driving force D, which drives the driver circuit 29 in order to move the movable unit 30a to the position S, has a first PWM duty dx as the driving-force component in the first direction x, and a second PWM duty dy as the driving-force component in the second direction y.

The anti-shake unit 30 is an apparatus which corrects the hand-shake effect, by moving the imaging unit 39a to the position S, by canceling lag of the photographic subject image on the imaging surface of the imaging device 39a1, and by stabilizing the photographing subject image that reaches the imaging surface of the imaging device 39a1.

The anti-shake unit 30 has a movable unit 30a, which includes the imaging unit 39a, and a fixed unit 30b. Or, the anti-shake unit 30 is composed of a driving part which moves the movable unit 30a by electromagnetic force to the position S, and a position-detecting part which detects the position of the movable unit 30a (a detected-position P).

The size and the direction of the electro-magnetic force are determined by the size and the direction of the current which flows in the coil, and the size and the direction of the magnetic-field of the magnet.

The driving of the movable unit 30a of the anti-shake unit 30, is performed by the driver circuit 29 which has the first PWM duty dx input from the PWM 0 of the CPU 21 and has the second PWM duty dy input from the PWM 1 of the CPU 21. The detected-position P of the movable unit 30a either before moving or after moving, which is moved by driving the driver circuit 29, is detected by the hall element unit 44b and the hall-element signal-processing unit 45.

Information of a first location in the first direction x for the detected-position P, in other words a first detected-position signal px is input to the A/D converter A/D 2 of the CPU 21. The first detected-position signal px is an analogue signal, and is converted to a digital signal through the A/D converter A/D 2 (A/D converting operation). The first location in the first direction x for the detected-position P, after the A/D converting operation, is defined as pdx, corresponding to the first detected-position signal px.

Information of a second location in the second direction y for the detected-position P, in other words a second detected-position signal py is input to the A/D converter A/D 3 of the CPU 21. The second detected-position signal py is an analogue signal, and is converted to a digital signal through the A/D converter A/D 3 (A/D converting operation). The second location in the second direction y for the detected-position P, after the A/D converting operation, is defined as pdy, corresponding to the second detected-position signal py.

The PID (Proportional Integral Differential) control is performed on the basis of the data for the detected-position P (pdx, pdy) and the data for the position S (sx, sy) which should be moved to.

The movable unit 30a has a first driving coil 31a, a second driving coil 32a, an imaging unit 39a, a position-detecting magnet 41a, a movable circuit board 49a, a shaft for movement 50a, a first bearing unit for horizontal movement 51a, a second bearing unit for horizontal movement 52a, a third bearing unit for horizontal movement 53a, and a plate 64a (see FIGS. 4, 5, and 6).

The fixed unit 30b has a first driving magnet 33b, a second driving magnet 34b, a first driving yoke 35b, a second driving yoke 36b, a position-detecting yoke 43b, a hall element unit 44b, a first bearing unit for vertical movement 54b, a second bearing unit for vertical movement 55b, a third bearing unit for vertical movement 56b, a fourth bearing unit for vertical movement 57b, and a base board 65b.

The shaft for movement 50a of the movable unit 30a has a channel shape when viewed from the third direction z. The first, second, third, and fourth bearing units for vertical movement 54b, 55b, 56b, and 57b are attached to the base board 65b of the fixed unit 30b. The shaft for movement 50a is slidably supported in the vertical direction (the second direction y), by the first, second, third, and fourth bearing units for vertical movement 54b, 55b, 56b, and 57b.

The first and second bearing units for vertical movement 54b and 55b have slots which extend in the second direction y.

Therefore, the movable unit 30a can move relative to the fixed unit 30b, in the vertical direction (the second direction y).

The shaft for movement 50a is slidably supported in the horizontal direction (the first direction x), by the first, second, and third bearing units for horizontal movement 51a, 52a, and 53a of the movable unit 30a. Therefore, the movable unit 30a, except for the shaft for movement 50a, can move relative to the fixed unit 30b and the shaft for movement 50a, in the horizontal direction (the first direction x).

Figure 7:
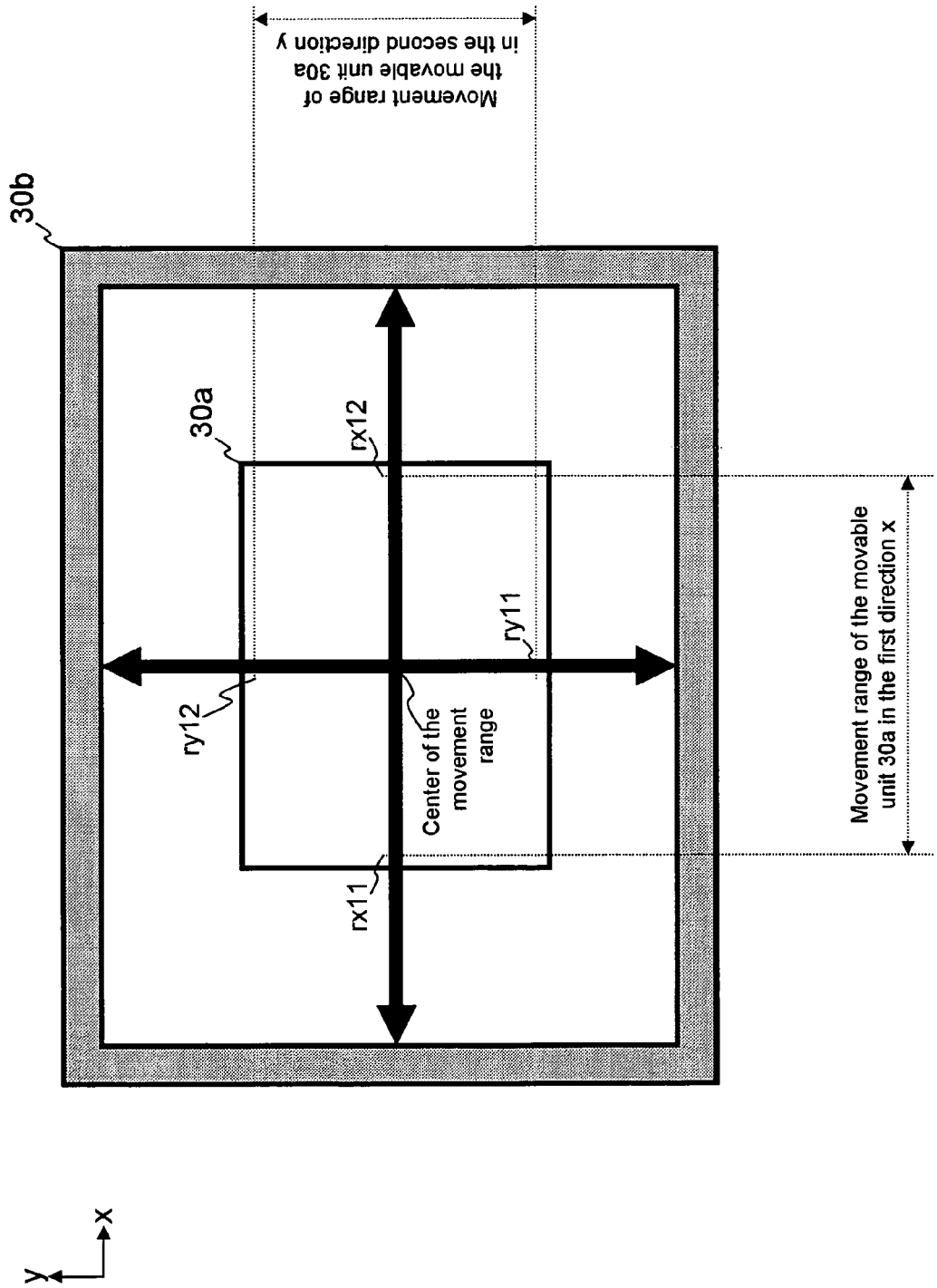
FIG. 7 is a plane view showing a movement range of the movable unit.

The movement range of the movable unit 30a means the movement range of the center of the movable unit 30a. One of the edge points in the movement range of the movable unit 30a in the first direction x, is a first horizontal edge-point rx11, another of the edge points in the movement range of the movable unit 30a in the first direction x, is a second horizontal edge-point rx12, one of the edge points in the movement range of the movable unit 30a in the second direction y, is a first vertical edge-point ry11, and another of the edge points in the movement range of the movable unit 30a in the second direction y, is a second vertical edge-point ry12 (see FIG. 7). In FIG. 7, the forms of the movable unit 30a and the fixed unit 30b are simplified.

When the center area of the imaging device 39a1 is located on the optical axis LX of the camera lens 67, the location relation between the movable unit 30a and the fixed unit 30b is set up so that the movable unit 30a is located at the center of its movement range in both the first direction x and the second direction y, in order to utilize the full size of the imaging range of the imaging device 39a1.

A rectangle shape, which forms the imaging surface of the imaging device 39a1, has two diagonal lines. In the first embodiment, the center of the imaging device 39a1 is the crossing point of these two diagonal lines.

The imaging unit 39a, the plate 64a, and the movable circuit board 49a are attached, in this order along the optical axis LX direction, viewed from the side of the camera lens 67. The imaging unit 39a has an imaging device 39a1 (such as a CCD or a COMS etc.), a stage 39a2, a holding unit 39a3, and an optical low-pass filter 39a4. The stage 39a2 and the plate 64a hold and urge the imaging device 39a1, the holding unit 39a3, and the optical low-pass filter 39a4 in the optical axis LX direction.

The first, second, and third bearing units for horizontal movement 51a, 52a, and 53a are attached to the stage 39a2. The imaging device 39a1 is attached to the plate 64a, so that positioning of the imaging device 39a1 is performed where the imaging device 39a1 is perpendicular to the optical axis LX of the camera lens 67. In the case where the plate 64a is made of a metallic material, the plate 64a has the effect of radiating heat from the imaging device 39a1, by contacting the imaging device 39a1.

The first driving coil 31a, the second driving coil 32a, and the position-detecting magnet 41a are attached to the movable circuit board 49a.

The first driving coil 31a forms a seat and a spiral shape coil pattern. The coil pattern of the first driving coil 31a has lines which are parallel to either the first direction x or the second direction y, where the movable unit 30a which includes the first driving coil 31a, is moved in the first direction x, by a first electro-magnetic force. The lines which are parallel to the second direction y, are used for moving the movable unit 30a in the first direction x. The lines which are parallel to the second direction y, have a first effective length L1.

The first electro-magnetic force occurs on the basis of the current direction of the first driving coil 31a and the magnetic-field direction of the first driving magnet 33b.

The second driving coil 32a forms a seat and a spiral shape coil pattern. The coil pattern of the second driving coil 32a has lines which are parallel to either the first direction x or the second direction y, where the movable unit 30a which includes the second driving coil 32a, is moved in the second direction y, by a second electro-magnetic force. The lines which are parallel to the first direction x, are used for moving the movable unit 30a in the second direction y. The lines which are parallel to the first direction x, have a second effective length L2.

The second electro-magnetic force occurs on the basis of the current direction of the second driving coil 32a and the magnetic-field direction of the second driving magnet 34b.

In the first embodiment, the first driving coil 31a is attached to the right edge area of the movable circuit board 49a (one of the edge areas of the movable circuit board 49a in the first direction x), viewed from the third direction z and the opposite side of the camera lens 67.

Similarly, the second driving coil 32a is attached to the upper area of the movable circuit board 49a (one of the edge areas of the movable circuit board 49a in the second direction y), viewed from the third direction z and the opposite side of the camera lens 67.

Further, the position-detecting magnet 41a is attached to the left edge area of the movable circuit board 49a (another of the edge areas of the movable circuit board 49a in the first direction x), viewed from the third direction z and the opposite side of the camera lens 67.

The imaging device 39a1 is attached to the middle area of the movable circuit board 49a between the first driving coil 31a and the position-detecting magnet 41a, in the first direction x.

The first and second driving coils 31a and 32a, the imaging device 39a1, and the position-detecting magnet 41a, are attached on the same side of the movable circuit board 49a.

The first and second driving coils 31a and 32a are connected with the driver circuit 29 which drives the first and second driving coils 31a and 32a through the flexible circuit board (not depicted). The first PWM duty dx is input to the driver circuit 29 from the PWM 0 of the CPU 21, and the second PWM duty dy is input to the driver circuit 29 from the PWM 1 of the CPU 21. The driver circuit 29 supplies power to the first driving coil 31a corresponding to the value of the first PWM duty dx, and to the second driving coil 32a corresponding to the value of the second PWM duty dy, to drive the movable unit 30a.

The position-detecting magnet 41a is used for detecting the first location in the first direction x of the movable unit 30a and the second location in the second direction y of the movable unit 30a.

The position-detecting magnet 41a is attached to the movable circuit board 49a, under the condition where the N pole and S pole are arranged in the third direction z. The position-detecting magnet 41a has a front-surface, which faces the fixed unit 30b and is a square having peripheral sides which are parallel to one of the first direction x and the second direction y.

Because the front-surface of the position-detecting magnet 41a, which faces the fixed unit 30b, is square shaped, detecting the position of the movable unit 30a in the first direction x is not influenced by movement of the movable unit 30a in the second direction y. Further, detecting the position of the movable unit 30a in the second direction y is not influenced by movement of the movable unit 30a in the first direction x.

Further, the position detecting operation in the first direction x using the first horizontal hall element hh1 and the second horizontal hall element hh2, and the position detecting operation in the second direction y using the first vertical hall element hv1 and the second vertical hall element hv2 can be performed using the same position-detecting magnet 41a.

The first driving magnet 33b is attached to the movable unit side of the fixed unit 30b, where the first driving magnet 33b faces the first driving coil 31a in the third direction z.

The second driving magnet 34b is attached to the movable unit side of the fixed unit 30b, where the second driving magnet 34b faces the second driving coil 32a in the third direction z.

The hall element unit 44b is attached to the movable unit side of the fixed unit 30b, where the hall element unit 44b faces the position-detecting magnet 41a.

The position-detecting yoke 43b is attached to a back surface side of the fixed unit 30b, which is the opposite side to the surface having the hall element unit 44b. The position-detecting yoke 43b is made of a magnetic material, and raises the magnetic-flux density between the position-detecting magnet 41a and the hall element unit 44b.

The first driving magnet 33b is attached to the first driving yoke 35b, under the condition where N pole and S pole are arranged in the first direction x. The first driving yoke 35b is attached to the base board 65b of the fixed unit 30b, on the side of the movable unit 30a, in the third direction z.

The length of the first driving magnet 33b in the second direction y, is longer in comparison with the first effective length L1 of the first driving coil 31a. The magnetic-field which influences the first driving coil 31a, is not changed during movement of the movable unit 30a in the second direction y.

The second driving magnet 34b is attached to the second driving yoke 36b, under the condition where N pole and S pole are arranged in the second direction y. The second driving yoke 36b is attached to the base board 65b of the fixed unit 30b, on the side of the movable unit 30a, in the third direction z.

The length of the second driving magnet 34b in the first direction x, is longer in comparison with the second effective length L2 of the second driving coil 32a. The magnetic-field which influences the second driving coil 32a, is not changed during movement of the movable unit 30a in the first direction x.

The first driving yoke 35b is made of a soft magnetic material, and forms a square-u-shaped channel when viewed from the second direction y. The first driving magnet 33b and the first driving coil 31a are inside the channel of the first driving yoke 35b.

The side of the first driving yoke 35b, which contacts the first driving magnet 33b, prevents the magnetic-field of the first driving magnet 33b from leaking to the surroundings.

The other side of the first driving yoke 35b (which faces the first driving magnet 33b, the first driving coil 31a, and the movable circuit board 49a) raises the magnetic-flux density between the first driving magnet 33b and the first driving coil 31a.

The second driving yoke 36b is made of a soft magnetic material, and forms a square-u-shaped channel when viewed from the first direction x. The second driving magnet 34b and the second driving coil 32a are inside the channel of the second driving yoke 36b.

The side of the second driving yoke 36b, which contacts the second driving magnet 34b, prevents the magnetic-field of the second driving magnet 34b from leaking to the surroundings.

The other side of the second driving yoke 36b (which faces the second driving magnet 34b, the second driving coil 32a, and the movable circuit board 49a) raises the magnetic-flux density between the second driving magnet 34b and the second driving coil 32a.

Figure 19:
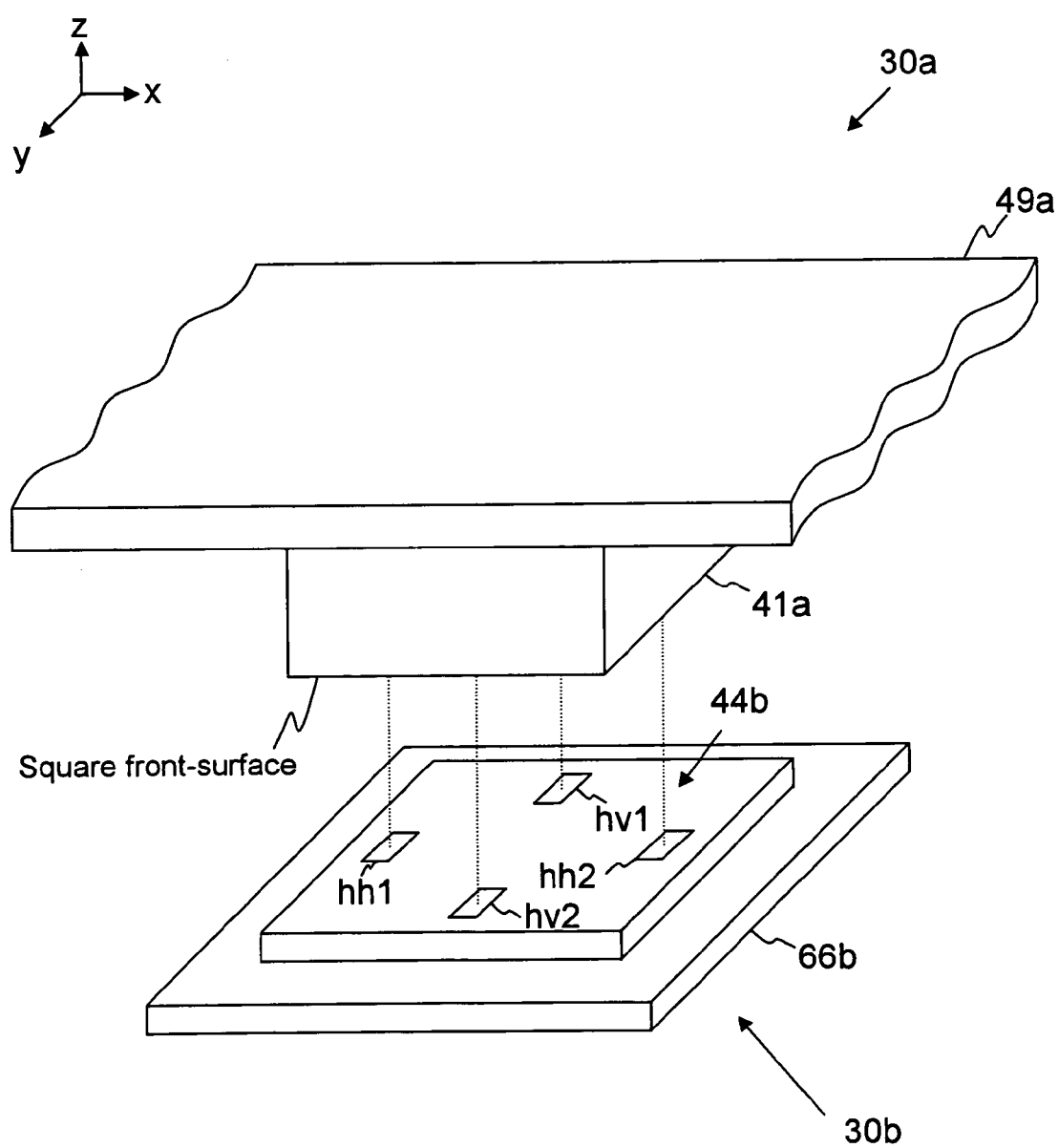
FIG. 19 is a perspective view of the movable unit and the fixed unit.

The hall element unit 44b is a two-axes hall element which has four hall elements that are magnetoelectric converting elements (magnetic-field change-detecting elements) using the Hall Effect (see FIG. 19). The hall element unit 44b detects the first detected-position signal px, which is used for specifying the first location in the first direction x for the present position P of the movable unit 30a, and the second detected-position signal py, which is used for specifying the second location in the second direction y for the present position P of the movable unit 30a.

Two of the four hall elements are a first horizontal hall element hh1 and a second horizontal hall element hh2 for detecting the first location in the first direction x, so that the others are a first vertical hall element hv1 and a second vertical hall element hv2 for detecting the second location in the second direction y.

An input terminal of the first horizontal hall element hh1 and an input terminal of the second horizontal hall element hh2 are connected in series, in order to detect the first location in the first direction x of the movable unit 30a. The first horizontal hall element hh1 and the second horizontal hall element hh2 are attached to the base board 65b of the fixed unit 30b, under the condition where the first horizontal hall element hh1 and the second horizontal hall element hh2 face the position-detecting magnet 41a of the movable unit 30a, in the third direction z.

When the center of the imaging device 39a1, passes through the optical axis LX (see FIG. 19), it is desirable that the first horizontal hall element hh1 is located at a place on the hall element unit 44b which faces midway along a side of the square front-surface, in the second direction y, of the position-detecting magnet 41a, the second horizontal hall element hh2 is located at a place on the hall element unit 44b which faces midway along the other side of the square front-surface, in the second direction y, of the position-detecting magnet 41a (the square front-surface facing the hall element unit 44b, viewed from the third direction z), to perform the position-detecting operation utilizing the full size of the square front-surface of the position-detecting magnet 41a.

An input terminal of the first vertical hall element hv1 and an input terminal of the second vertical hall element hv2 are connected in series, in order to detect the second location in the second direction y of the movable unit 30a. The first vertical hall element hv1 and the second vertical hall element hv2 are attached to the base board 65b of the fixed unit 30b, under the condition where the first vertical hall element hv1 and the second vertical hall element hv2 face the position-detecting magnet 41a of the movable unit 30a, in the third direction z.

When the center of the imaging device 39a1, passes through the optical axis LX, it is desirable that the first vertical hall element hv1 is located at a place on the hall element unit 44b which faces midway along a side of the square front-surface, in the first direction x, of the position-detecting magnet 41a, the second vertical hall element hv2 is located at a place on the hall element unit 44b which faces midway along the other side of the square front-surface, in the first direction x, of the position-detecting magnet 41a (the square front-surface facing the hall element unit 44b, viewed from the third direction z), to perform the position-detecting operation utilizing the full size of the square front-surface of the position-detecting magnet 41a.

The base board 65b is a plate state member which becomes the base for attaching the hall element unit 44b etc., and is arranged being parallel to the imaging surface of the imaging device 39a1.

In the first embodiment, the base board 65b is arranged at the side nearer to the camera lens 67 in comparison with the movable circuit board 49a, in the third direction z. However, the movable circuit board 49a may be arranged at the side nearer to the camera lens 67 in comparison with the base board 65b. In this case, the first and second driving coils 31a and 32a, and the position-detecting magnet 41a are arranged on the opposite side of the movable circuit board 49a to the camera lens 67, so that the first and second driving magnets 33b and 34b, and the hall element unit 44b are arranged on the same side of the movable circuit board 49a as the camera lens 67.

The hall-element signal-processing unit 45 detects a first horizontal potential-difference x1 between output terminals of the first horizontal hall element hh1, based on an output signal of the first horizontal hall element hh1.

The hall-element signal-processing unit 45 detects a second horizontal potential-difference x2 between output terminals of the second horizontal hall element hh2, based on an output signal of the second horizontal hall element hh2.

The hall-element signal-processing unit 45 outputs the first detected-position signal px, which specifies the first location in the first direction x of the movable unit 30a, to the A/D converter A/D 2 of the CPU 21, on the basis of the first and second horizontal potential-differences x1 and x2.

The hall-element signal-processing unit 45 detects a first vertical potential-difference y1 between output terminals of the first vertical hall element hv1, based on an output signal of the first vertical hall element hv1.

The hall-element signal-processing unit 45 detects a second vertical potential-difference y2 between output terminals of the second vertical hall element hv2, based on an output signal of the second vertical hall element hv2.

The hall-element signal-processing unit 45 outputs the second detected-position signal py, which specifies the second location in the second direction y of the movable unit 30a, to the A/D converter A/D 3 of the CPU 21, on the basis of the first and second vertical potential-differences y1 and y2.

Current having the optimized horizontal hall-element current-value xDi, which flows through the input terminals of the first and second horizontal hall elements hh1 and hh2 when detecting the first location in the first direction x of the movable unit 30a, is determined by the first initial-adjustment operation.

Current having the optimized vertical hall-element is current-value yDi, which flows through the input terminals of the first and second vertical hall elements hv1 and hv2 when detecting the second location in the second direction y of the movable unit 30a, is determined by the second initial-adjustment operation.

In the first initial-adjustment operation, a first detecting-resolution of the A/D converter A/D 2 for A/D converting the first detected-position signal px, is adjusted and improved. Or, the width between the minimum and maximum values of the first detected-position signal px is maximized, in the movement range of the movable unit 30a, and in the A/D converting range of the CPU 21.

In the second initial-adjustment operation, a second detecting-resolution of the A/D converter A/D 3 for A/D converting the second detected-position signal py, is adjusted and improved. Or, the width between the minimum and maximum values of the second detected-position signal py is maximized, in the movement range of the movable unit 30a, and in the A/D converting range of the CPU 21.

Specifically, in the first initial-adjustment operation, first and second horizontal hall-element current-values xDi1 and xDi2 are calculated, so that the optimized horizontal hall-element current-value xDi which is the smaller value of the first and second horizontal hall-element current-values xDi1 and xDi2, is determined and stored in the memory unit 72.

The first horizontal hall-element current-value xDi1 is a value of the current which flows through the input terminals of the first horizontal hall element hh1 (or the second horizontal hall element hh2) when the output value of the first detected-position signal px becomes a maximum value in the A/D converting range of the CPU 21, and when the center of the movable unit 30a contacts the first horizontal edge-point rx11.

The second horizontal hall-element current-value xDi2 is a value of the current which flows through the input terminals of the first horizontal hall element hh1 (or the second horizontal hall element hh2) when the output value of the first detected-position signal px becomes a minimum value in the A/D converting range of the CPU 21, and when the center of the movable unit 30a contacts the second horizontal edge-point rx12.

Specifically, in the second initial-adjustment operation, first and second vertical hall-element current-values yDi1 and yDi2 are calculated, so that the optimized vertical hall-element current-value yDi which is the smaller value of the first and second vertical hall-element current-values yDi1 and yDi2, is determined and stored in the memory unit 72.

The first vertical hall-element current-value yDi1 is a value of the current which flows through the input terminals of the first vertical hall element hv1 (or the second vertical hall element hv2) when the output value of the second detected-position signal py becomes a maximum value in the A/D converting range of the CPU 21, and when the center of the movable unit 30a contacts the first vertical edge-point ry11.

The second vertical hall-element current-value yDi2 is a value of the current which flows through the input terminals of the first vertical hall element hv1 (or the second vertical hall element hv2) when the output value of the second detected-position signal py becomes a minimum value in the A/D converting range of the CPU 21, and when the center of the movable unit 30a contacts the second vertical edge-point ry12.

The first voltage XVf, corresponding to the optimized horizontal hall-element current-value xDi, is applied to the circuit 456 of the hall-element signal-processing unit 45, from the D/A converter D/A 0 of the CPU 21.

The second voltage YVf, corresponding to the optimized vertical hall-element current-value yDi, is applied to the circuit 466 of the hall-element signal-processing unit 45, from the D/A converter D/A 1 of the CPU 21.

Figure 8:
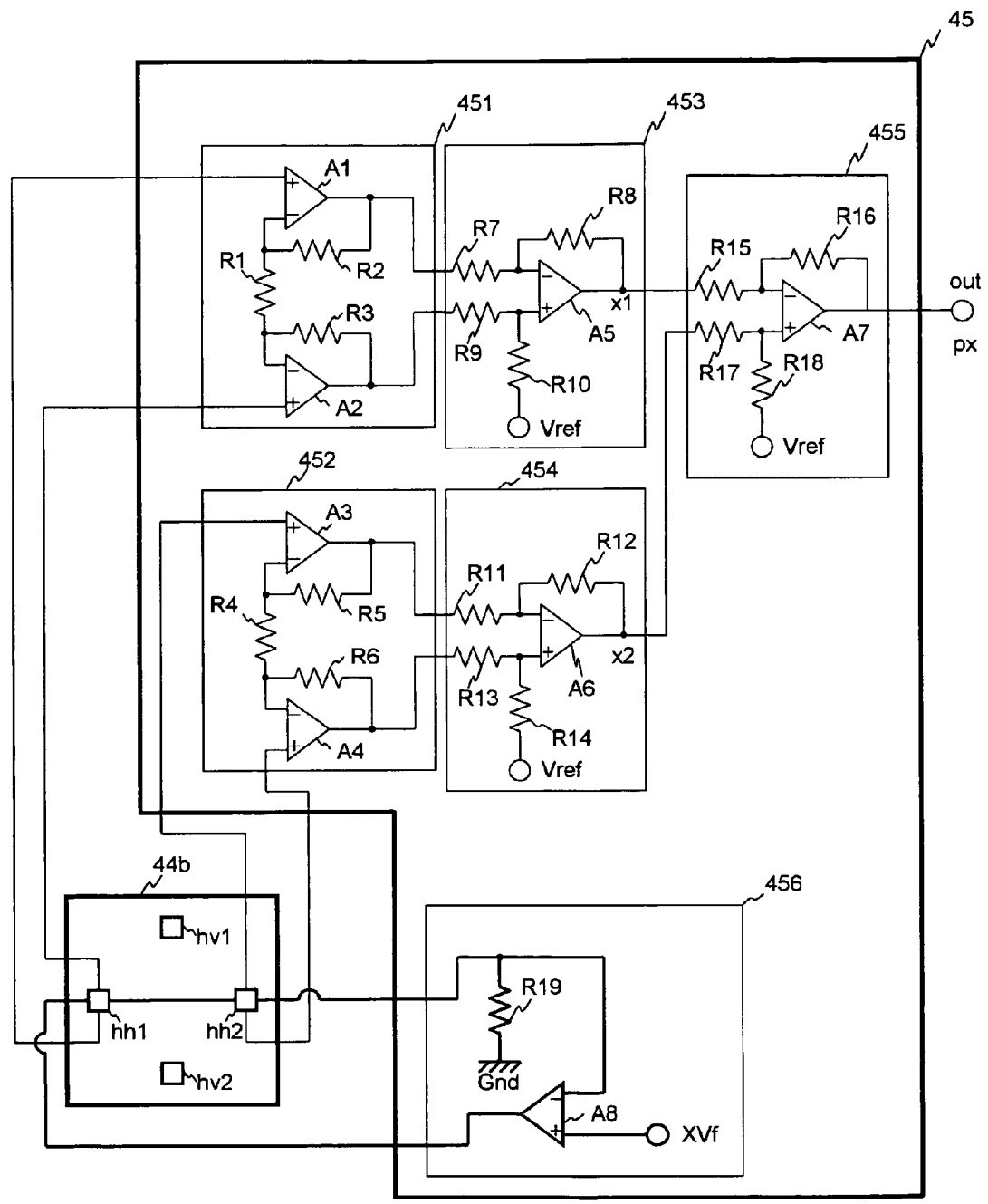
FIG. 8 is a circuit construction diagram of the part of the circuit for detecting the first location in the first direction of the movable unit, with the two-axes hall element and the hall-element signal-processing circuit, in the first embodiment.

The circuit construction regarding input/output signals of the first and second horizontal hall elements hh1 and hh2, in the hall-element signal-processing unit 45 is explained using FIG. 8. The circuit construction regarding the first and second vertical hall elements hv1 and hv2 is omitted in FIG. 8, in order to simplify the explanation.

Figure 9:
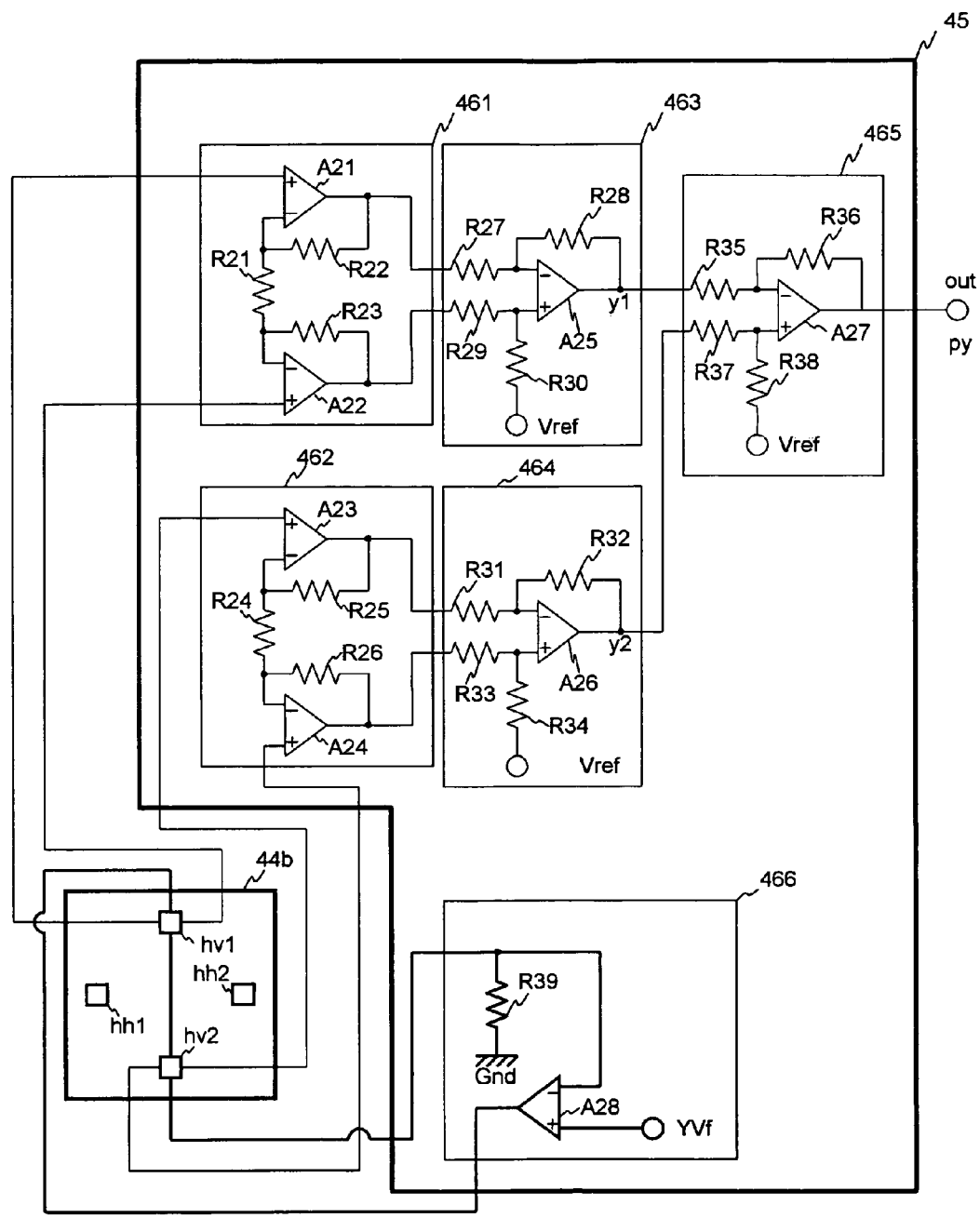
FIG. 9 is a circuit construction diagram of the part of the circuit for detecting the second location in the second direction of the movable unit, with the two-axes hall element and the hall-element signal-processing circuit, in the first embodiment.

The circuit construction regarding input/output signals of the first and second vertical hall elements hv1 and hv2, in the hall-element signal-processing unit 45 is explained using FIG. 9. The circuit construction regarding the first and second horizontal hall elements hh1 and hh2 is omitted in FIG. 9, in order to simplify the explanation.

The hall-element signal-processing unit 45 has a circuit 451, a circuit 452, a circuit 453, a circuit 454, and a circuit 455, for controlling the output of the first and second horizontal hall elements hh1 and hh2, and has a circuit 456 for controlling the input of the first and second horizontal hall elements hh1 and hh2.

The hall-element signal-processing unit 45 has a circuit 461, a circuit 462, a circuit 463, a circuit 464, and a circuit 466, for controlling the output of the first and second vertical hall elements hv1 and hv2, and has a circuit 466 for controlling the input of the first and second vertical hall elements hv1 and hv2.

Both output terminals of the first horizontal hall element hh1 are connected with the circuit 451, so that the circuit 451 is connected with the circuit 453.

Both output terminals of the second horizontal hall element hh2 are connected with the circuit 452, so that the circuit 452 is connected with the circuit 454.

The circuits 453 and 454 are connected with the circuit 455.

The circuit 451 is a differential amplifier circuit which amplifies the signal difference between the output terminals of the first horizontal hall element hh1, so that the circuit 452 is a differential amplifier circuit which amplifies the signal difference between the output terminals of the second horizontal hall element hh2.

The circuit 453 is a subtracting circuit which calculates the first horizontal potential-difference x1 on the basis of the difference between the amplified signal difference from the circuit 451 and a reference voltage Vref.

The circuit 454 is a subtracting circuit which calculates the second horizontal potential-difference x2 on the basis of the difference between the amplified signal difference from the circuit 452 and the reference voltage Vref.

The circuit 455 is a subtracting amplifier circuit which calculates the first detected-position signal px by multiplying a first amplification rate AA1 by the difference between the first horizontal potential-difference x1 and the second horizontal potential-difference x2.

The circuit 451 has a resistor R1, a resistor R2, a resistor R3, an operational amplifier A1, and an operational amplifier A2. The operational amplifier A1 has an inverting input terminal, a non-inverting input terminal, and an output terminal. The operational amplifier A2 has an inverting input terminal, a non-inverting input terminal, and an output terminal.

One of the output terminals of the first horizontal hall element hh1 is connected with the non-inverting input terminal of the operational amplifier A1, so that the other terminal of the first horizontal hall element hh1 is connected with the non-inverting input terminal of the operational amplifier A2.

The inverting input terminal of the operational amplifier A1 is connected with the resistors R1 and R2, so that the inverting input terminal of the operational amplifier A2 is connected with the resistors R1 and R3.

The output terminal of the operational amplifier A1 is connected with the resistor R2 and the resistor R7 in the circuit 453. The output terminal of the operational amplifier A2 is connected with the resistor R3 and the resistor R9 in the circuit 453.

The circuit 452 has a resistor R4, a resistor R5, a resistor R6, an operational amplifier A3, and an operational amplifier A4. The operational amplifier A3 has an inverting input terminal, a non-inverting input terminal, and an output terminal. The operational amplifier A4 has an inverting input terminal, a non-inverting input terminal, and an output terminal.

One of the output terminals of the second horizontal hall element hh2 is connected with the non-inverting input terminal of the operational amplifier A3, so that the other terminal of the second horizontal hall element hh2 is connected with the non-inverting input terminal of the operational amplifier A4.

The inverting input terminal of the operational amplifier A3 is connected with the resistors R4 and R5, so that the inverting input terminal of the operational amplifier A4 is connected with the resistor R4 and R6.

The output terminal of the operational amplifier A3 is connected with the resistor R5 and the resistor R11 in the circuit 454. The output terminal of the operational amplifier A4 is connected with the resistor R6 and the resistor R13 in the circuit 454.

The circuit 453 has a resistor R7, a resistor R8, a resistor R9, a resistor R10, and an operational amplifier A5. The operational amplifier A5 has an inverting input terminal, a non-inverting input terminal, and an output terminal.

The inverting input terminal of the operational amplifier A5 is connected with the resistors R7 and R8. The non-inverting input terminal of the operational amplifier A5 is connected with the resistors R9 and R10. The output terminal of the operational amplifier A5 is connected with the resistor R8 and the resistor R15 in the circuit 455. The first horizontal potential-difference x1 is output from the output terminal of the operational amplifier A5. One of the terminals of the resistor R10 is connected with the power supply whose voltage is the reference voltage Vref.

The circuit 454 has a resistor R11, a resistor R12, a resistor R13, a resistor R14, and an operational amplifier A6. The operational amplifier A6 has an inverting input terminal, a non-inverting input terminal, and an output terminal.

The inverting input terminal of the operational amplifier A6 is connected with the resistors R11 and R12. The non-inverting input terminal of the operational amplifier A6 is connected with the resistors R13 and R14. The output terminal of the operational amplifier A6 is connected with the resistor R12 and the resistor R17 in the circuit 455. The second horizontal potential-difference x2 is output from the output terminal of the operational amplifier A6. One of the terminals of the resistor R14 is connected with the power supply whose voltage is the reference voltage Vref.

The circuit 455 has a resistor R15, a resistor R16, a resistor R17, a resistor R18, and an operational amplifier A7. The operational amplifier A7 has an inverting input terminal, a non-inverting input terminal, and an output terminal.

The inverting input terminal of the operational amplifier A7 is connected with the resistors R15 and R16. The non-inverting input terminal of the operational amplifier A7 is connected with the resistors R17 and R18. The output terminal of the operational amplifier A7 is connected with the resistor R16. The first detected-position signal px, obtained by multiplying the first amplification rate AA1 by the difference between the first horizontal potential-difference x1 and the second horizontal potential-difference x2, is output from the output terminal of the operational amplifier A7. One of the terminals of the resistor R18 is connected with the power supply whose voltage is the reference voltage Vref.

The values of the resistors R1 and R4 are the same. The values of the resistors R2, R3, R5, and R6 are the same. The values of the resistors R7~R14 are the same. The values of the resistors R15 and R17 are the same. The values of the resistors R16 and R18 are the same.

The first amplification rate AA1 is based on the values of the resistors R15~R18 (the ratio of the value of the resistor R15 to the value of the resistor R16).

The operational amplifiers A1~A4 are the same type of amplifier. The operational amplifiers A5 and A6 are the same type of amplifier.

The circuit 456 has a resistor R19 and an operational amplifier A8. The operational amplifier AB has an inverting input terminal, a non-inverting input terminal, and an output terminal.

The inverting input terminal of the operational amplifier A8 is connected with the resistor R19 and one of the input terminals of the second horizontal hall element hh2. The potential of the non-inverting input terminal of the operational amplifier A8 is set at the first voltage XVf corresponding to the current having the optimized horizontal hall-element current-value xDi, that flows through the input terminals of the first and second horizontal hall elements hh1 and hh2. The value of the first voltage XVf is obtained by multiplying the optimized horizontal hall-element current-value xDi by the value of the resistor R19.

The output terminal of the operational amplifier AB is connected with the one of the input terminals of the first horizontal hall element hh1. The input terminal of the first horizontal hall element hh1 and the input terminal of the second horizontal hall element hh2 are connected in series. One of the terminals of the resistor R19 is grounded.

Both output terminals of the first vertical hall element hv1 are connected with the circuit 461, so that the circuit 461 is connected with the circuit 463.

Both output terminals of the second vertical hall element hv2 are connected with the circuit 462, so that the circuit 462 is connected with the circuit 464.

The circuits 463 and 464 are connected with the circuit 465.

The circuit 461 is a differential amplifier circuit which amplifies the signal difference between the output terminals of the first vertical hall element hv1, so that the circuit 462 is a differential amplifier circuit which amplifies the signal difference between the output terminals of the second vertical hall element hv2.

The circuit 463 is a subtracting circuit which calculates the first vertical potential-difference y1 on the basis of the difference between the amplified signal difference from the circuit 461 and the reference voltage Vref.

The circuit 464 is a subtracting circuit which calculates the second vertical potential-difference y2 on the basis of the difference between the amplified signal difference from the circuit 462 and the reference voltage Vref.

The circuit 465 is a subtracting amplifier circuit which calculates the second detected-position signal py by multiplying a second amplification rate AA2 by the difference between the first vertical potential-difference y1 and the second vertical potential-difference y2.

The circuit 461 has a resistor R21, a resistor R22, a resistor R23, an operational amplifier A21, and an operational amplifier A22. The operational amplifier A21 has an inverting input terminal, a non-inverting input terminal, and an output terminal. The operational amplifier A22 has an inverting input terminal, a non-inverting input terminal, and an output terminal.

One of the output terminals of the first vertical hall element hv1 is connected with the non-inverting input terminal of the operational amplifier A21, so that the other terminal of the first vertical hall element hv1 is connected with the non-inverting input terminal of the operational amplifier A22.

The inverting input terminal of the operational amplifier A21 is connected with the resistors R21 and R22, so that the inverting input terminal of the operational amplifier A22 is connected with the resistors R21 and R23.

The output terminal of the operational amplifier A21 is connected with the resistor R22 and the resistor R27 in the circuit 463. The output terminal of the operational amplifier A22 is connected with the resistor R23 and the resistor R29 in the circuit 463.

The circuit 462 has a resistor R24, a resistor R25, a resistor R26, an operational amplifier A23, and an operational amplifier A24. The operational amplifier A23 has an inverting input terminal, a non-inverting input terminal, and an output terminal. The operational amplifier A24 has an inverting input terminal, a non-inverting input terminal, and an output terminal.

One of the output terminals of the second vertical hall element hv2 is connected with the non-inverting input terminal of the operational amplifier A23, so that the other terminal of the second vertical hall element hv2 is connected with the non-inverting input terminal of the operational amplifier A24.

The inverting input terminal of the operational amplifier A23 is connected with the resistors R24 and R25, so that the inverting input terminal of the operational amplifier A24 is connected with the resistor R24 and R26.

The output terminal of the operational amplifier A23 is connected with the resistor R25 and the resistor R31 in the circuit 464. The output terminal of the operational amplifier A24 is connected with the resistor R26 and the resistor R33 in the circuit 464.

The circuit 463 has a resistor R27, a resistor R28, a resistor R29, a resistor R30, and an operational amplifier A25. The operational amplifier A25 has an inverting input terminal, a non-inverting input terminal, and an output terminal.

The inverting input terminal of the operational amplifier A25 is connected with the resistors R27 and R28. The non-inverting input terminal of the operational amplifier A25 is connected with the resistors R29 and R30. The output terminal of the operational amplifier A25 is connected with the resistor R28 and the resistor R35 in the circuit 465. The first vertical potential-difference y1 is output from the output terminal of the operational amplifier A25. One of the terminals of the resistor R30 is connected with the power supply whose voltage is the reference voltage Vref.

The circuit 464 has a resistor R31, a resistor R32, a resistor R33, a resistor R34, and an operational amplifier A26. The operational amplifier A26 has an inverting input terminal, a non-inverting input terminal, and an output terminal.

The inverting input terminal of the operational amplifier A26 is connected with the resistors R31 and R32. The non-inverting input terminal of the operational amplifier A26 is connected with the resistors R33 and R34. The output terminal of the operational amplifier A26 is connected with the resistor R32 and the resistor R37 in the circuit 465. The second vertical potential-difference y2 is output from the output terminal of the operational amplifier A26. One of the terminals of the resistor R34 is connected with the power supply whose voltage is the reference voltage Vref.

The circuit 465 has a resistor R35, a resistor R36, a resistor R37, a resistor R38, and an operational amplifier A27. The operational amplifier A27 has an inverting input terminal, a non-inverting input terminal, and an output terminal.

The inverting input terminal of the operational amplifier A27 is connected with the resistors R35 and R36. The non-inverting input terminal of the operational amplifier A27 is connected with the resistors R37 and R38. The output terminal of the operational amplifier A27 is connected with the resistor R36. The second detected-position signal py, obtained by multiplying the second amplification rate AA2 by the difference between the first vertical potential-difference y1 and the second vertical potential-difference y2, is output from the output terminal of the operational amplifier A27. One of the terminals of the resistor R38 is connected with the power supply whose voltage is the reference voltage Vref.

The values of the resistors R21 and R24 are the same. The values of the resistors R22, R23, R25, and R26 are the same. The values of the resistors R27~R34 are the same. The values of the resistors R35 and R37 are the same. The values of the resistors R36 and R38 are the same.

The second amplification rate AA2 is based on the values of the resistors R35~R38 (the ratio of the value of the resistor R35 to the value of the resistor R36).

The operational amplifiers A21~A24 are the same type of amplifier. The operational amplifiers A25 and A26 are the same type of amplifier.

The circuit 466 has a resistor R39 and an operational amplifier A28. The operational amplifier A28 has an inverting input terminal, a non-inverting input terminal, and an output terminal.

The inverting input terminal of the operational amplifier A28 is connected with the resistor R39 and one of the input terminals of the second vertical hall element hv2. The potential of the non-inverting input terminal of the operational amplifier A28 is set at the second voltage YVf corresponding to the current having the optimized vertical hall-element current-value yDi, that flows through the input terminals of the first and second vertical hall elements hv1 and hv2. The value of the second voltage YVf is obtained by multiplying the optimized vertical hall-element current-value yDi by the value of the resistor R39.

The output terminal of the operational amplifier A28 is connected with the one of the input terminals of the first vertical hall element hv1. The input terminal of the first vertical hall element hv1 and the input terminal of the second vertical hall element hv2 are connected in series. One of the terminals of the resistor R39 is grounded.

The initial-adjustment operation which adjusts the detecting-resolution in the A/D converting operation for the first and second detected-position signals px and py, can also be performed by changing the values of the first and second amplification rates AA1 and AA2. The value of the first amplification rate AA1 can be changed corresponding to changing the values of the resistors R16 and R18 in the circuit 455. The values of the second amplification rate AA2 can be changed corresponding to changing the values of the resistors R36 and R38 in the circuit 465. Changing the values of the resistors needs a mechanical adjustment. Accordingly, this initial-adjustment operation is a problem.

In the initial-adjustment operation of the first embodiment, the values of the first and second amplification rates AA1 and AA2 are fixed (not changed), so that the first initial-adjustment operation which changes the value of the current which flows through the input terminals of the first and second horizontal hall elements hh1 and hh2, and the second initial-adjustment operation which changes the value of the current which flows through the input terminals of the first and second vertical hall elements hv1 and hv2, are performed.

Figure 10:
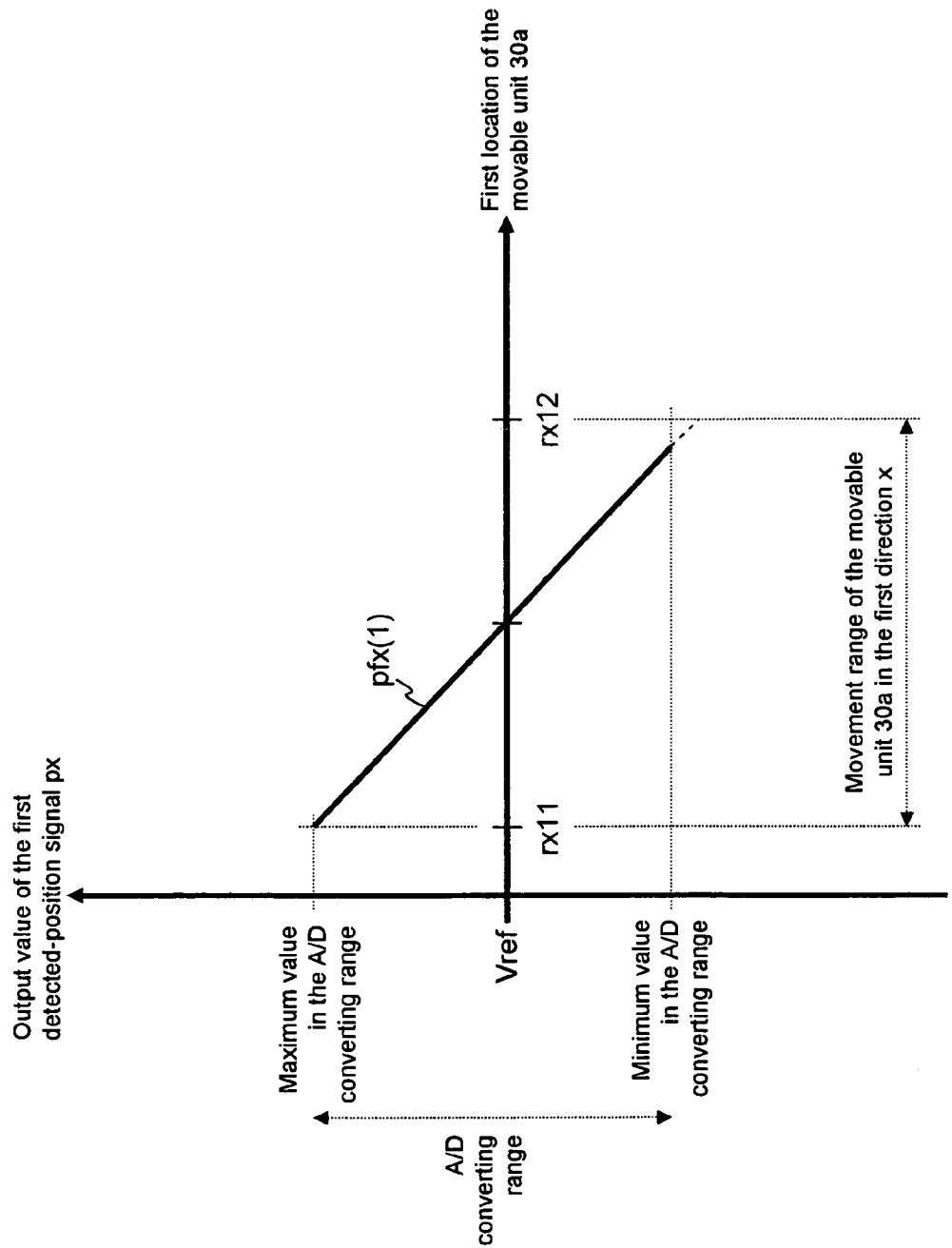
FIG. 10 shows a relationship between the first location in the first direction of the movable unit and the output value of the first detected-position signal, when the center of the movable unit contacts the first horizontal edge-point, and when the value of the current (the first horizontal hall-element current-value) which flows through the input terminals of the first and second horizontal hall elements, is adjusted, where the output value of the first detected-position signal is the same as the maximum value in the A/D converting range of the A/D converter of the CPU.
Figure 11:
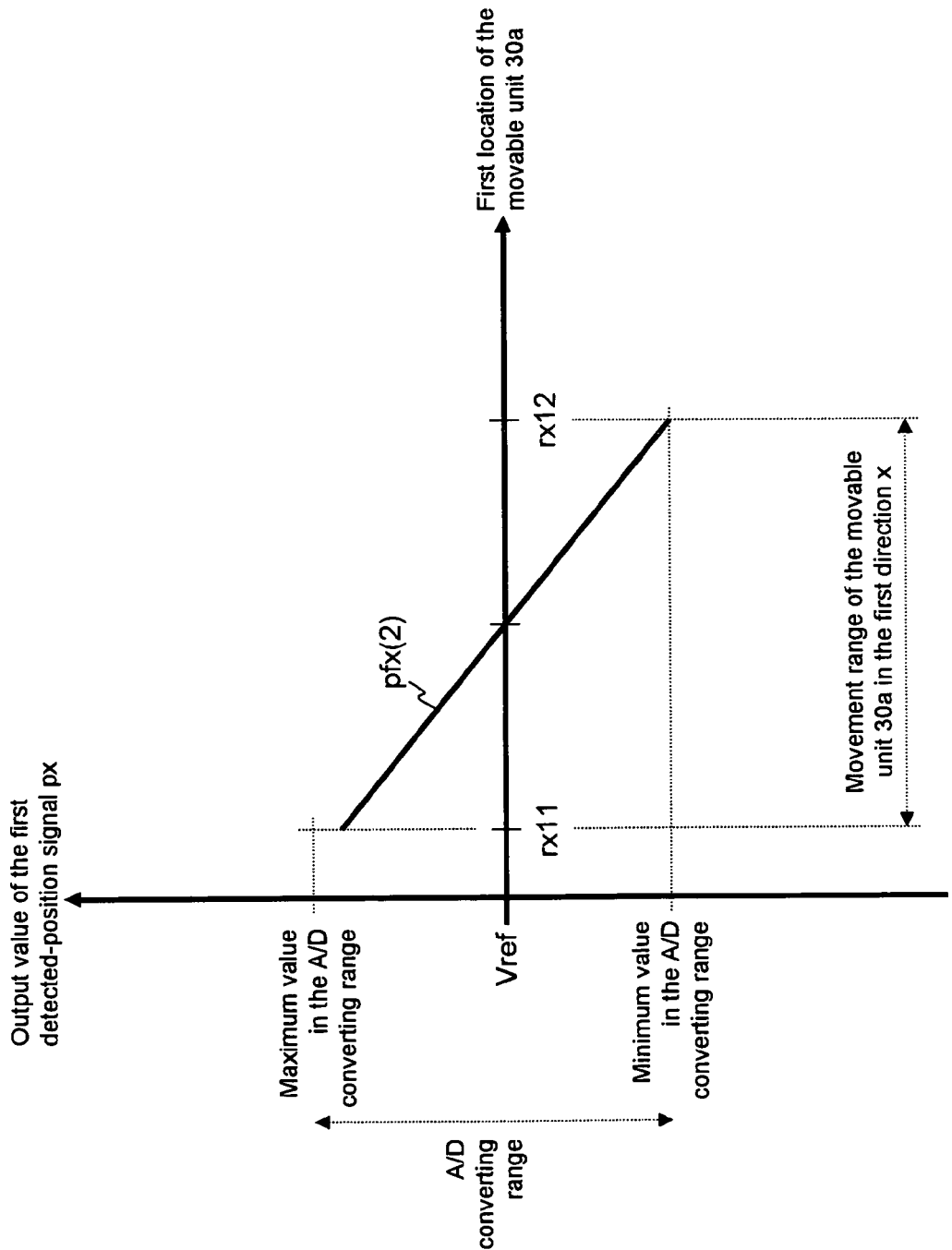
FIG. 11 shows a relationship between the first location in the first direction of the movable unit and the output value of the first detected-position signal, when the center of the movable unit contacts the second horizontal edge-point, and when the value of the current (the second horizontal hall-element current-value) which flows through the input terminals of the first and second horizontal hall elements, is adjusted, where the output value of the first detected-position signal is the same as the minimum value in the A/D converting range of the A/D converter of the CPU.

Specifically, the first initial-adjustment operation is explained by using FIGS. 10 and 11.

FIG. 10 shows a relationship between the first location in the first direction x of the movable unit 30a and the output value of the first detected-position signal px, when the center of the movable unit 30a contacts the first horizontal edge-point rx11, and when the value of the current (the first horizontal hall-element current-value xDi1) which flows through the input terminals of the first and second horizontal hall elements hh1 and hh2, is adjusted, where the output value of the first detected-position signal px is the same as the maximum value in the A/D converting range of the A/D converter A/D 2 of the CPU 21.

A first line pfx(1) in FIG. 10 is composed of a thick line and a broken line. The broken line part of the first line pfx(1) shows a condition where the output value of the first detected-position signal px is under the minimum value in the A/D converting range of the A/D converter A/D 2 of the CPU 21, so that an accurate position detecting operation can not be performed, when the center of the movable unit 30a contacts the second horizontal edge-point rx12.

FIG. 11 shows a relationship between the first location in the first direction x of the movable unit 30a and the output value of the first detected-position signal px, when the center of the movable unit 30a contacts the second horizontal edge-point rx12, and when the value of the current (the second horizontal hall-element current-value xDi2) which flows through the input terminals of the first and second horizontal hall elements hh1 and hh2, is adjusted, where the output value of the first detected-position signal px is the same as the minimum value in the A/D converting range of the A/D converter A/D 2 of the CPU 21.

A second line pfx(2) in FIG. 11 is composed of a thick line. The thick line of the second line pfx(2) shows a condition where the output value of the first detected-position signal px is not over the maximum value in the A/D converting range of the A/D converter A/D 2 of the CPU 21, so that an accurate position detecting operation can be performed, when the center of the movable unit 30a contacts the first horizontal edge-point rx11.

Accordingly, the accurate position detecting operation can be performed in the movement range of the movable unit 30a in the first direction x.

The first detected-position signal px is a functional of a first magnetic-flux density B1 between the first and second horizontal hall elements hh1 and hh2, and the position detecting magnet 41a, and a value of the current which flows through the input terminals of the first and second horizontal hall elements hh1 and hh2.

The second detected-position signal py is a functional of a second magnetic-flux density B2 between the first and second vertical hall elements hv1 and hv2, and the position detecting magnet 41a, and a value of the current which flows through the input terminals of the first and second vertical hall elements hv1 and hv2.

It is judged whether the first horizontal hall-element current-value xDi1 is smaller than the second horizontal hall-element current-value xDi2, so that the smaller value of the first and second horizontal hall-element current-values xDi1 and xDi2, is determined as the optimized horizontal hall-element current-value xDi.

In this example which is shown in FIGS. 10 and 11, the second horizontal hall-element current-value xDi2 is smaller than the first horizontal hall-element current-value xDi1, so that the second horizontal hall-element current-value xDi2 is determined as the optimized horizontal hall-element current-value xDi.

Similarly, the second initial-adjustment operation is performed, so that the optimized vertical hall-element current-value yDi is determined (not depicted).

The optimized horizontal hall-element current-value xDi and the optimized vertical hall-element current-value yDi are stored in the memory unit 72.

When the movable unit 30a is located at the center of its movement range in both the first direction x and the second direction y, and when the output value of the first detected-position signal px agrees with the reference voltage Vref, the first and second horizontal hall-element current-values xDi1 and xDi2 are the same. Or, when a value of the current which flows through the input terminals of the first and second horizontal hall elements hh1 and hh2, is set under the condition where a maximum output value of the first detected-position signal px agrees with the maximum value in the A/D converting range of the A/D converter A/D 2 of the CPU 21, a minimum output value of the first detected-position signal px agrees with the minimum value in the A/D converting range of the A/D converter A/D 2 of the CPU 21.

However, in order to make the output value of the first detected-position signal px strictly agree with the reference voltage Vref, when the movable unit 30a is located at the center of its movement range, an additional adjustment, which considers mechanical gaps of the anti-shake unit 30 and error in the values of the resistors of the hall-element signal-processing unit 45, is needed. A relationship between the second detected-position signal py and the first and second vertical hall-element current-values yDi1 and yDi2, is similar to that between the first detected-position signal px and the first and second horizontal hall-element current-values xDi1 and xDi2, which is described above.

In the first embodiment, the optimized horizontal hall-element current-value xDi can be calculated without strict agreement between the output value of the first detected-position signal px and the reference voltage Vref. Similarly, the optimized vertical hall-element current-value yDi can be calculated without the strict agreement between the output value of the second detected-position signal py and the reference voltage Vref.

Further, the first initial-adjustment operation is composed of an electrical adjustment which adjusts the value of the current which flows through the input terminals of the first and second horizontal hall elements hh1 and hh2 (not a mechanical adjustment). Similarly, the second initial-adjustment operation is composed of an electrical adjustment which adjusts the value of the current which flows through the input terminals of the first and second vertical hall-elements hv1 and hv2 (not a mechanical adjustment). Accordingly, usability can be improved in comparison with when the initial-adjustment operation includes a mechanical adjustment for adjusting the values of the resistors etc.

Further, because the optimized horizontal and optimized vertical hall-element current-values xDi and yDi are stored in the memory unit 72, these values are not deleted even if the photographing apparatus 1 (the memory unit 72) is set to the off state (power off). Accordingly, the first and second initial-adjustment operations may be performed only one time, in order for the CPU 21 to read the optimized horizontal and optimized vertical hall-element current-values xDi and yDi.

Figure 12:
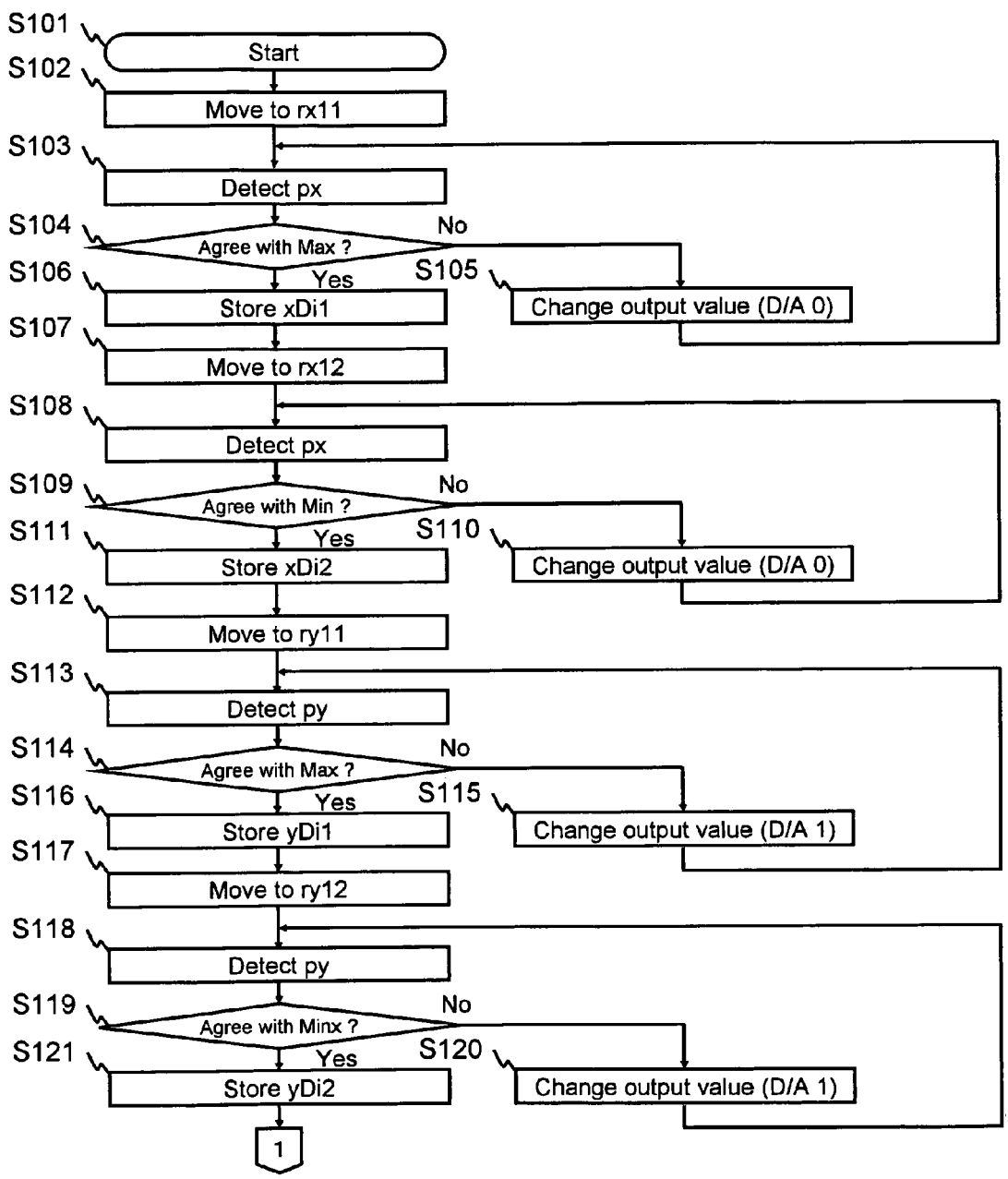
FIG. 12 is a flowchart that shows the first half part of the first and second initial-adjustment operations.
Figure 13:
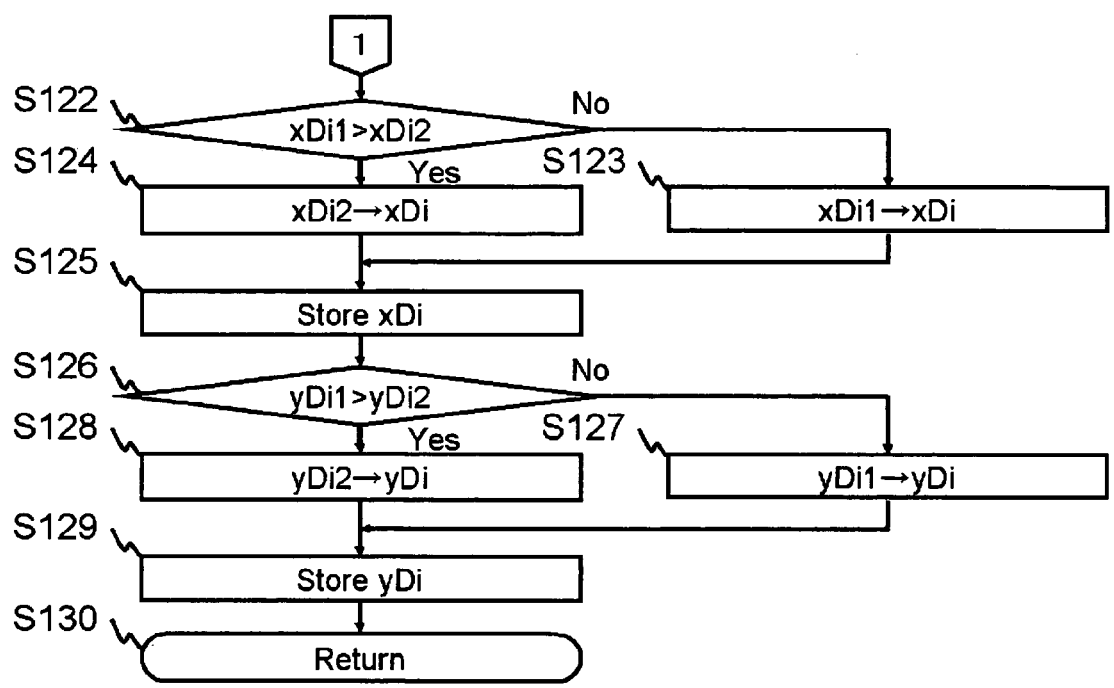
FIG. 13 is a flowchart that shows the second half part of the first and second initial-adjustment operations.

Next, the flow of the first and second initial-adjustment operations is explained by using the flowcharts in FIGS. 12 and 13.

In step S101, the adjusting unit 71 is set to the on state, so that the photographing apparatus 1 is set in the adjusting mode, and the first and second initial-adjustment operations are started.

In step S102, the first PWM duty dx is input to the driver circuit 29 from the PWM 0 of the CPU 21, so that the movable unit 30a is moved to where the center of the movable unit 30a contacts the first horizontal edge-point rx11. In step S103, the first detected-position signal px, is detected at this time and is input to the A/D converter A/D 2 of the CPU 21.

In step S104, it is judged whether the output value of the first detected-position signal px agrees with the maximum value in the A/D converting range of the A/D converter A/D 2 of the CPU 21.

When it is judged that the output value of the first detected-position signal px does not agree with the maximum value in the A/D converting range of the A/D converter A/D 2 of the CPU 21, the output value, which is output to the hall-element signal-processing unit 45, from the D/A converter D/A 0 of the CPU 21, is changed, so that the flow is returned to step S103, in step S105.

When it is judged that the output value of the first detected-position signal px agrees with the maximum value in the A/D converting range of the A/D converter A/D 2 of the CPU 21, the value of the current (the first horizontal hall-element current-value xDi1) which flows through the input terminals of the first and second horizontal hall elements hh1 and hh2 at this time, is temporarily stored in the CPU 21 etc, in step S106.

In step S107, the first PWM duty dx is input to the driver circuit 29 from the PWM 0 of the CPU 21, so that the movable unit 30a is moved to where the center of the movable unit 30a contacts the second horizontal edge-point rx12. In step S108, the first detected-position signal px at this time, is detected and is input to the A/D converter A/D 2 of the CPU 21.

In step S109, it is judged whether the output value of the first detected-position signal px agrees with the minimum value in the A/D converting range of the A/D converter A/D 2 of the CPU 21.

When it is judged that the output value of the first detected-position signal px does not agree with the minimum value in the A/D converting range of the A/D converter A/D 2 of the CPU 21, the output value, which is output to the hall-element signal-processing unit 45, from the D/A converter D/A 0 of the CPU 21, is changed, so that the flow is returned to step S108, in step S110.

When it is judged that the output value of the first detected-position signal px agrees with the minimum value in the A/D converting range of the A/D converter A/D 2 of the CPU 21, the value of the current (the second horizontal hall-element current-value xDi2) which flows through the input terminals of the first and second horizontal hall elements hh1 and hh2 at this time, is temporarily stored in the CPU 21 etc, in step S111.

In step S112, the second PWM duty dy is input to the driver circuit 29 from the PWM 1 of the CPU 21, so that the movable unit 30a is moved to where the center of the movable unit 30a contacts the first vertical edge-point ry11. In step S113, the second detected-position signal py at this time, is detected and is input to the A/D converter A/D 3 of the CPU 21.

In step S114, it is judged whether the output value of the second detected-position signal py agrees with the maximum value in the A/D converting range of the A/D converter A/D 3 of the CPU 21.

When it is judged that the output value of the second detected-position signal py does not agree with the maximum value in the A/D converting range of the A/D converter A/D 3 of the CPU 21, the output value, which is output to the hall-element signal-processing unit 45, from the D/A converter D/A 1 of the CPU 21, is changed, so that the flow is returned to step S113, in step S115.

When it is judged that the output value of the second detected-position signal py agrees with the maximum value in the A/D converting range of the A/D converter A/D 3 of the CPU 21, the value of the current (the first vertical hall-element current-value yDi1) which flows through the input terminals of the first and second vertical hall elements hv1 and hv2 at this time, is temporarily stored in the CPU 21 etc, in step S116.

In step S117, the second PWM duty dy is input to the driver circuit 29 from the PWM 1 of the CPU 21, so that the movable unit 30a is moved to where the center of the movable unit 30a contacts the second vertical edge-point ry12. In step S118, the second detected-position signal py at this time, is detected and is input to the A/D converter A/D 3 of the CPU 21.

In step S119, it is judged whether the output value of the second detected-position signal py agrees with the minimum value in the A/D converting range of the A/D converter A/D 3 of the CPU 21.

When it is judged that the output value of the second detected-position signal py does not agree with the minimum value in the A/D converting range of the A/D converter A/D 3 of the CPU 21, the output value, which is output to the hall-element signal-processing unit 45, from the D/A converter D/A 1 of the CPU 21, is changed, so that the flow is returned to step S118, in step S120.

When it is judged that the output value of the second detected-position signal py agrees with the minimum value in the A/D converting range of the A/D converter A/D 3 of the CPU 21, the value of the current (the second vertical hall-element current-value yDi2) which flows through the input terminals of the first and second vertical hall elements hv1 and hv2 at this time, is temporarily stored in the CPU 21 etc, in step S121.

In step S122, it is judged whether the first horizontal hall-element current-value xDi1 is larger than the second horizontal hall-element current-value xDi2.

When it is judged that the first horizontal hall-element current-value xDi1 is not larger than the second horizontal hall-element current-value xDi2, the optimized horizontal hall-element current-value xDi is set to the first horizontal hall-element current-value xDi1, in step S123.

When it is judged that the first horizontal hall-element current-value xDi1 is larger than the second horizontal hall-element current-value xDi2, the optimized horizontal hall-element current-value xDi is set to the second horizontal hall-element current-value xDi2, in step S124.

In step S125, the optimized horizontal hall-element current-value xDi is stored in the memory unit 72, so that the first initial-adjustment operation is finished.

In step S126, it is judged whether the first vertical hall-element current-value yDi1 is larger than the second vertical hall-element current-value yDi2.

When it is judged that the first vertical hall-element current-value yDi1 is not larger than the second vertical hall-element current-value yDi2, the optimized vertical hall-element current-value yDi is set to the first vertical hall-element current-value yDi1, in step S127.

When it is judged that the first vertical hall-element current-value yDi1 is larger than the second vertical hall-element current-value yDi2, the optimized vertical hall-element current-value yDi is set to the second vertical hall-element current-value yDi2, in step S128.

In step S129, the optimized vertical hall-element current-value yDi is stored in the memory unit 72. In step S130, the second initial-adjustment operation is finished.

Figure 14:
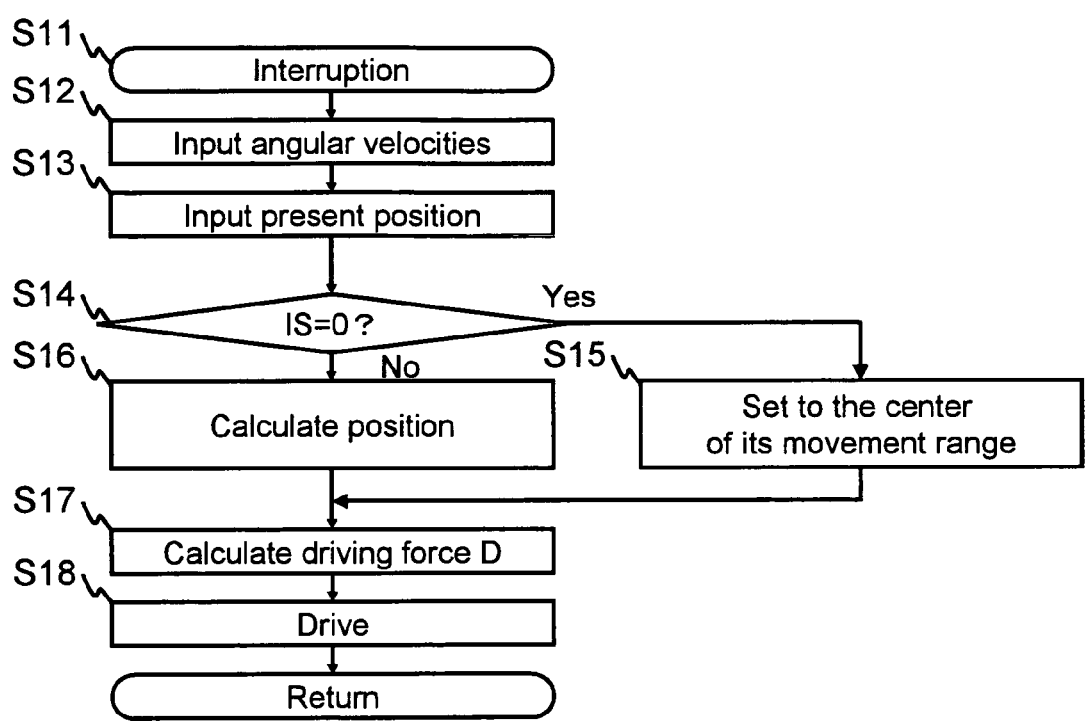
FIG. 14 is a flowchart of the anti-shake operation, which is performed at every predetermined time interval, as an interruption process.
Figure 15:
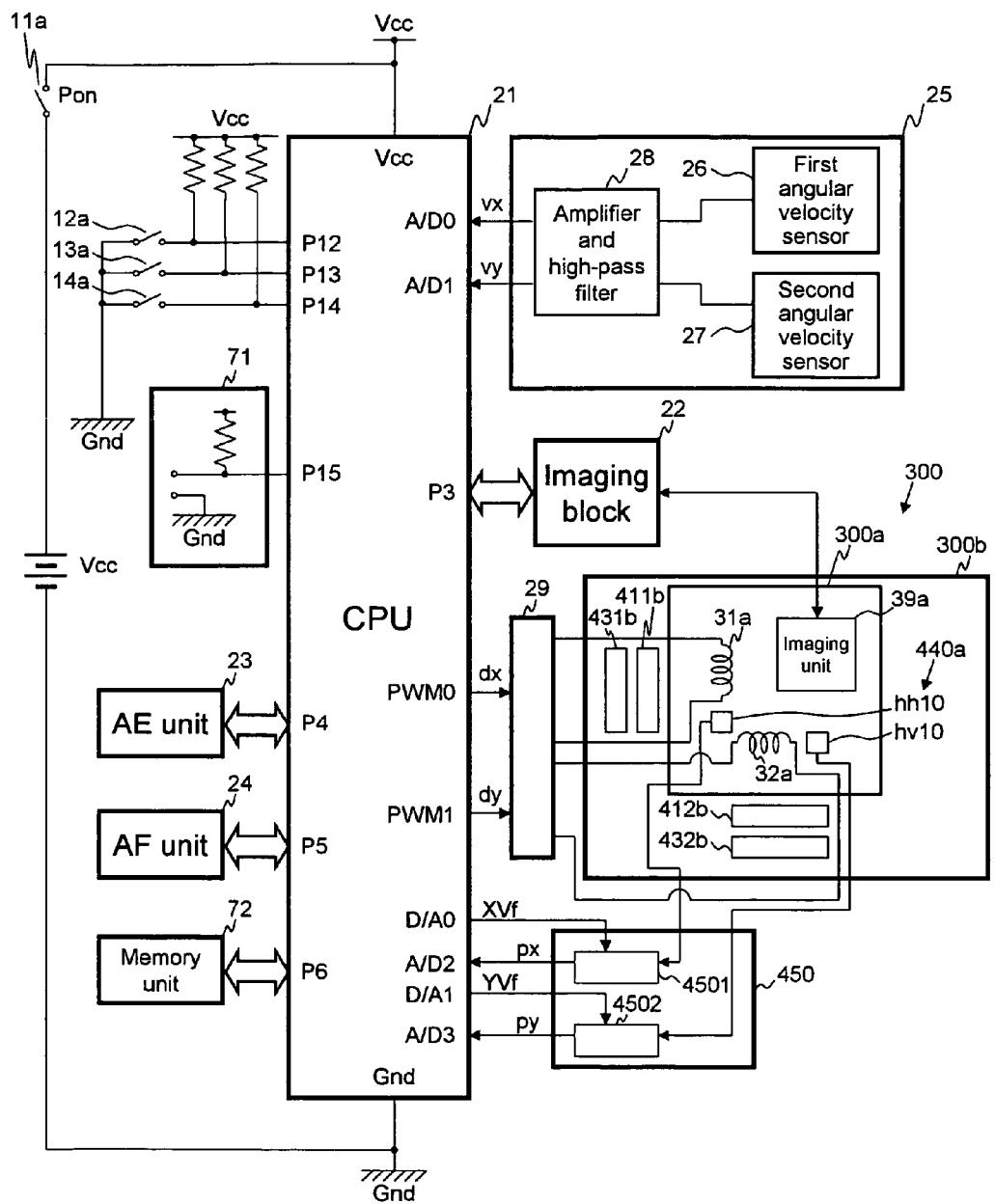
FIG. 15 is a circuit construction diagram of the photographing apparatus in the second embodiment.

Next, the flow of the anti-shake operation, which is performed at every predetermined time interval (1 ms) as an interruption process, independently of the other operations, is explained by using the flowchart in FIG. 14.

In step S11, the interruption process for the anti-shake operation is started. In step S12, the first angular velocity vx, which is output from the angular velocity detecting unit 25, is input to the A/D converter A/D 0 of the CPU 21 and is converted to a digital signal. The second angular velocity vy, which is output from the angular velocity detecting unit 25, is input to the A/D converter A/D 1 of the CPU 21 and is converted to a digital signal.

In step S13, the position of the movable unit 30a is detected by the hall element unit 44b, so that the first detected-position signal px, which is calculated by the hall-element signal-processing unit 45, is input to the A/D converter A/D 2 of the CPU 21 and is converted to a digital signal, and the second detected-position signal py, which is calculated by the hall-element signal-processing unit 45, is input to the A/D converter A/D 3 of the CPU 21 and is converted to a digital signal. Therefore, the present position of the movable unit 30a P (pdx, pdy) is determined.

At this time, the first voltage XVf is applied to the circuit 456 of the hall-element signal-processing unit 45 from the D/A converter D/A 0 of the CPU 21, where the optimized horizontal hall-element current-value xDi of the current flows through the input terminals of the first and second horizontal hall elements hh1 and hh2 of the hall element unit 44b, so that the second voltage YVf is applied to the circuit 466 of the hall-element signal-processing unit 45 from the D/A converter D/A 1 of the CPU 21, where the optimized vertical hall-element current-value yDi of the current flows through the input terminals of the first and second vertical hall elements hv1 and hv2 of the hall element unit 44b.

In step S14, it is judged whether the value of the IS is 0. When it is judged that the value of the IS is 0 (IS=0), in other words in the non anti-shake mode, the position S (sx, sy) of the movable unit 30a (the imaging unit 39a), which should be moved to, is set to the center of its movement range, in step S15. When it is judged that the value of the IS is not 0 (IS=1), in other words in the anti-shake mode, the position S (sx, sy) of the movable unit 30a (the imaging unit 39a), which should be moved to, is calculated on the basis of the first and second angular velocities vx and vy, in step S16.

In step S17, the driving force D, which drives the driver circuit 29 in order to move the movable unit 30a to the position S, in other words the first PWM duty dx and the second PWM duty dy, is calculated on the basis of the position S (sx, sy), which is determined in step S15 or step S16, and the present position P (pdx, pdy).

In step S18, the first driving coil 31a is driven by using the first PWM duty dx through the driver circuit 29, and the second driving coil 32a is driven by using the second PWM duty dy through the driver circuit 29, so that the movable unit 30a is moved.

The process in steps S17 and S18 is an automatic control calculation, which is used with the PID automatic control for performing general (normal) proportional, integral, and differential calculations.

Next, the second embodiment is explained. In the second embodiment, the hall element unit is a one-axis hall element which has a hall element for detecting the first location in the first direction x of the movable unit 30a, and a hall element for detecting the second location in the second direction y of the movable unit 30a.

Constructions of the photographing apparatus 1 in the second embodiment which are explained in FIGS. 1, 2, 7, and 10~14, are the same as those in the first embodiment. However, the construction of the movable unit 300a in the second embodiment is different from the construction of the movable unit 30a in the first embodiment, the construction of the fixed unit 300b in the second embodiment is different from the construction of the fixed unit 30b in the first embodiment, and the construction of the hall-element signal-processing unit 450 in the second embodiment is different from the construction of the hall-element signal-processing unit 45 in the first embodiment.

Therefore, the second embodiment is explained centering on the constructions of the photographing apparatus 1 in the second embodiment which are different from the constructions of the photographing apparatus 1 in the first embodiment, by using FIGS. 15~18. Parts in the second embodiment, which are the same as those in the first embodiment have the same numbers as those in the first embodiment.

Figure 16:
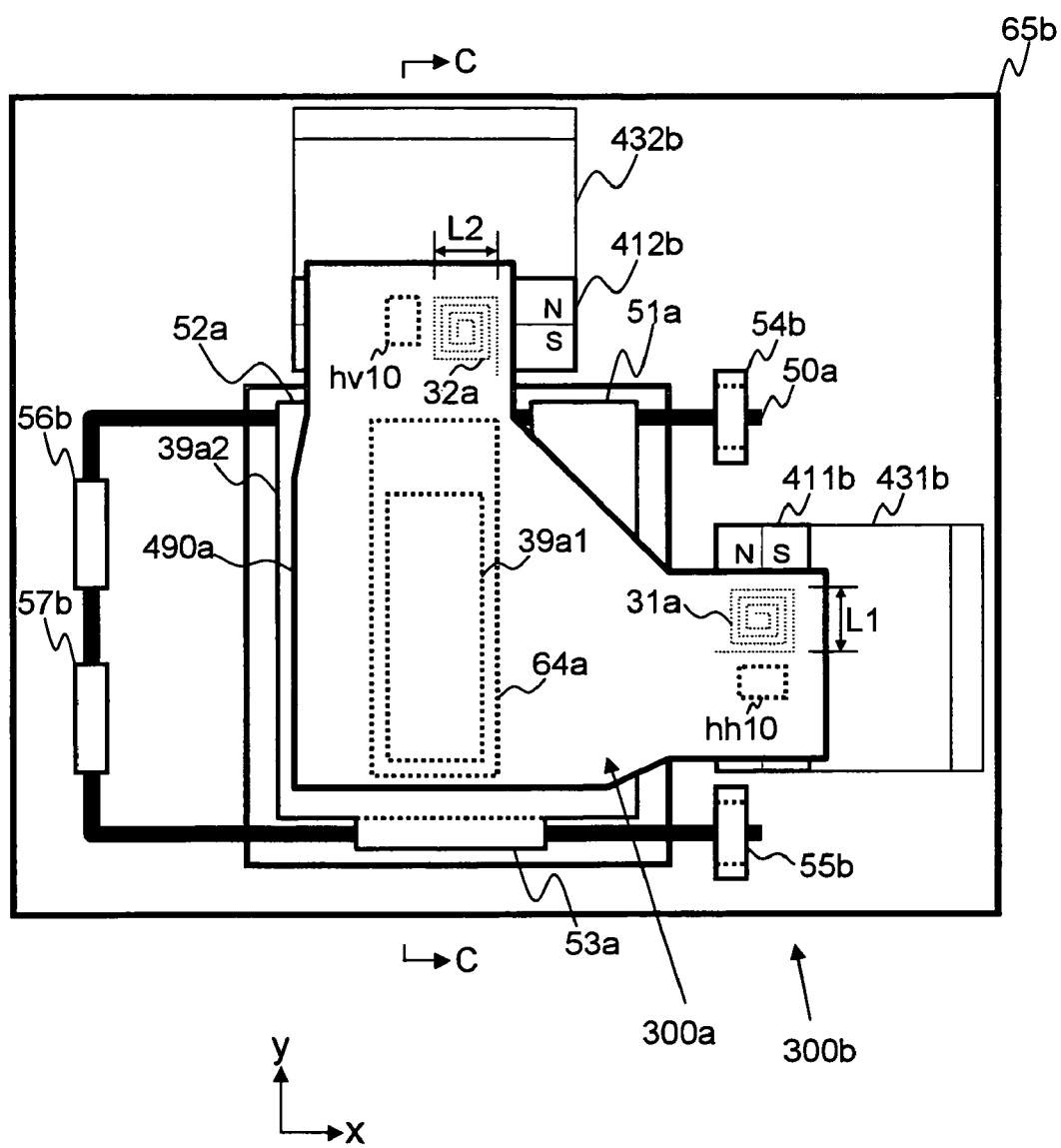
FIG. 16 is a figure showing the construction of the anti-shake unit in the second embodiment.
Figure 17:
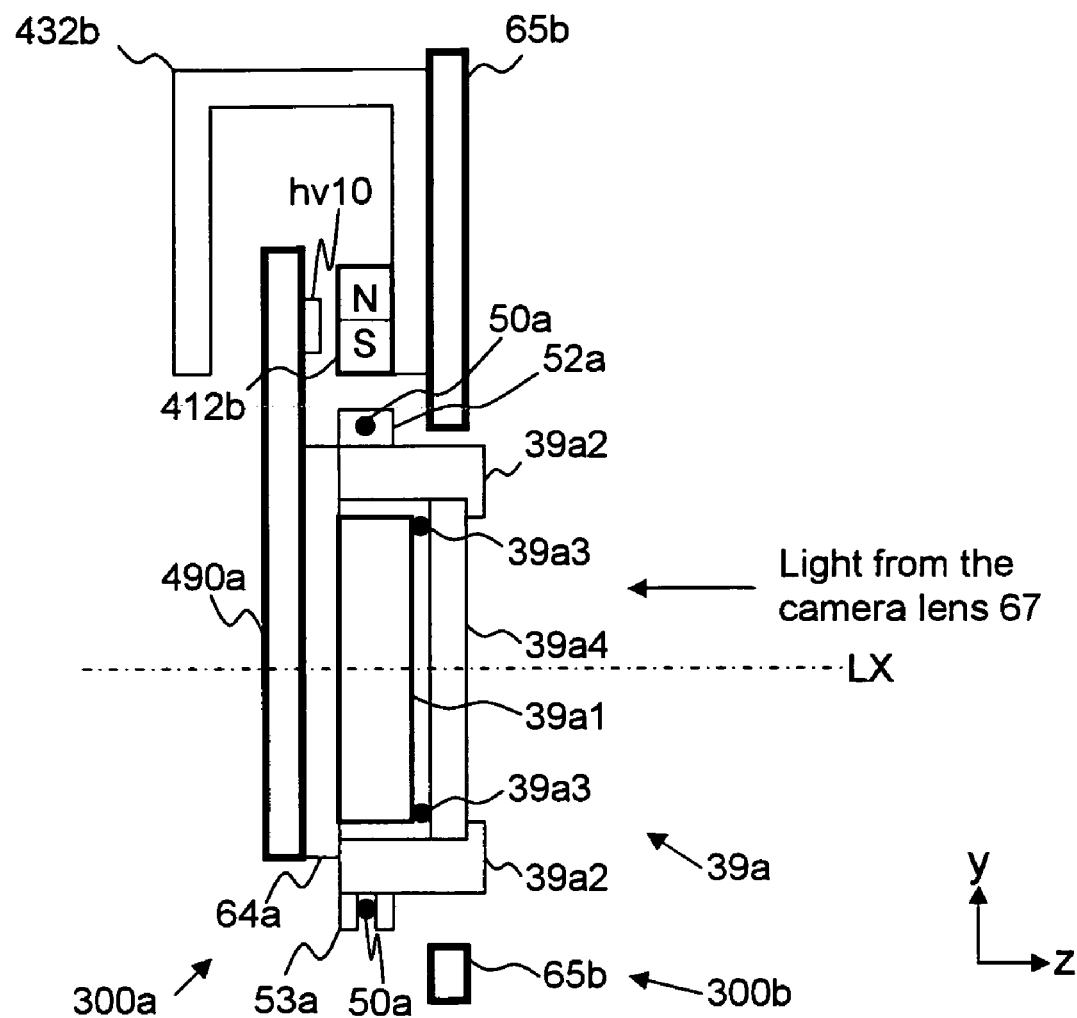
FIG. 17 is a view along line C-C of FIG. 16.

The movable unit 300a has a first driving coil 31a, a second driving coil 32a, an imaging unit 39a, a hall element unit 440a, a movable circuit board 490a, a shaft for movement 50a, a first bearing unit for horizontal movement 51a, a second bearing unit for horizontal movement 52a, a third bearing unit for horizontal movement 53a, and a plate 64a (see FIGS. 16 and 17).

The fixed unit 300b has a position-detecting magnet unit, a first position-detecting and driving yoke 431b, a second position-detecting and driving yoke 432b, a first bearing unit for vertical movement 54b, a second bearing unit for vertical movement 55b, a third bearing unit for vertical movement 56b, a fourth bearing unit for vertical movement 57b, and a base board 65b. The position-detecting magnet unit has a first position-detecting and driving magnet 411b and a second position-detecting and driving magnet 412b.

The construction of the shaft for movement 50a, supported by the first to fourth bearing units for vertical movement 54b to 57b, and supported by the first to third bearing units for horizontal movement 51a to 53a, are the same as those in the first embodiment.

The movement range of the movable unit 300a means the movement range of the center of the movable unit 300a. One of the edge points in the movement range of the movable unit 300a in the first direction x, is a first horizontal edge-point rx11, another of the edge points in the movement range of the movable unit 300a in the first direction x, is a second horizontal edge-point rx12, one of the edge points in the movement range of the movable unit 300a in the second direction y, is a first vertical edge-point ry11, and another of the edge points in the movement range of the movable unit 300a in the second direction y, is a second vertical edge-point ry12.

When the center area of the imaging device 39a1 is located on the optical axis LX of the camera lens 67, the location relation between the movable unit 300a and the fixed unit 300b is set up so that the movable unit 300a is located at the center of its movement range in both the first direction x and the second direction y, in order to utilize the full size of the imaging range of the imaging device 39a1.

A rectangle shape, which forms the imaging surface of the imaging device 39a1, has two diagonal lines. In the second embodiment, the center of the imaging device 39a1 is the crossing point of these two diagonal lines.

The imaging unit 39a, the plate 64a, and the movable circuit board 490a are attached, in this order along the optical axis LX direction, viewed from the side of the camera lens 67. The imaging unit 39a has an imaging device 39a1 (such as a CCD or a COMS etc.), a stage 39a2, a holding unit 39a3, and an optical low-pass filter 39a4. The stage 39a2 and the plate 64a hold and urge the imaging device 39a1, the holding unit 39a3, and the optical low-pass filter 39a4 in the optical axis LX direction.

The first, second, and third bearing units for horizontal movement 51a, 52a, and 53a are attached to the stage 39a2.

The imaging device 39a1 is attached to the plate 64a, so that positioning of the imaging device 39a1 is performed where the imaging device 39a1 is perpendicular to the optical axis LX of the camera lens 67. In the case where the plate 64a is made of a metallic material, the plate 64a has the effect of radiating heat from the imaging device 39a1, by contacting the imaging device 39a1.

The first driving coil 31a, the second driving coil 32a, and the hall element unit 440a are attached to the movable circuit board 490a.

The first driving coil 31a forms a seat and a spiral shape coil pattern. The coil pattern of the first driving coil 31a has lines which are parallel to either the first direction x or the second direction y, where the movable unit 300a which includes the first driving coil 31a, is moved in the first direction x, by the first electro-magnetic force. The lines which are parallel to the second direction y, are used for moving the movable unit 300a in the first direction x. The lines which are parallel to the second direction y, have a first effective length L1.

The first electro-magnetic force occurs on the basis of the current direction of the first driving coil 31a and the magnetic-field direction of the first position-detecting and driving magnet 411b.

The second driving coil 32a forms a seat and a spiral shape coil pattern. The coil pattern of the second driving coil 32a has lines which are parallel to either the first direction x or the second direction y, where the movable unit 300a which includes the second driving coil 32a, is moved in the second direction y, by the second electro-magnetic force. The lines which are parallel to the first direction x, are used for moving the movable unit 300a in the second direction y. The lines which are parallel to the first direction x, have a second effective length L2.

The second electro-magnetic force occurs on the basis of the current direction of the second driving coil 32a and the magnetic-field direction of the second position-detecting and driving magnet 412b.

The first and second driving coils 31a and 32a are connected with the driver circuit 29 which drives the first and second driving coils 31a and 32a through the flexible circuit board (not depicted). The first PWM duty dx is input to the driver circuit 29 from the PWM 0 of the CPU 21, and the second PWM duty dy is input to the driver circuit 29 from the PWM 1 of the CPU 21. The driver circuit 29 supplies power to the first driving coil 31a corresponding to the value of the first PWM duty dx, and to the second driving coil 32a corresponding to the value of the second PWM duty dy, to drive the movable unit 300a.

The first position-detecting and driving magnet 411b is attached to the movable unit side of the fixed unit 300b, where the first position-detecting and driving magnet 411b faces the first driving coil 31a and the horizontal hall element hh10 in the third direction z.

The second position-detecting and driving magnet 412b is attached to the movable unit side of the fixed unit 300b, where the second position-detecting and driving magnet 412b faces the second driving coil 32a and the vertical hall element hv10 in the third direction z.

The first position-detecting and driving magnet 411b is attached to the first position-detecting and driving yoke 431b, under the condition where the N pole and S pole are arranged in the first direction x. The first position-detecting and driving yoke 431b is attached to the base board 65b of the fixed unit 300b, on the side of the movable unit 300a, in the third direction z.

The length of the first position-detecting and driving magnet 411b in the second direction y, is longer in comparison with the first effective length L1 of the first driving coil 31a. The magnetic-field which influences the first driving coil 31a and the horizontal hall element hh10, is not changed during movement of the movable unit 300a in the second direction y.

The second position-detecting and driving magnet 412b is attached to the second position-detecting and driving yoke 432b, under the condition where the N pole and S pole are arranged in the second direction y. The second position-detecting and driving yoke 432b is attached to the base board 65b of the fixed unit 300b, on the side of the movable unit 300a, in the third direction z.

The length of the second position-detecting and driving magnet 412b in the first direction x, is longer in comparison with the second effective length L2 of the second driving coil 32a. The magnetic-field which influences the second driving coil 32a and the vertical hall element hv10, is not changed during movement of the movable unit 300a in the first direction x.

The first position-detecting and driving yoke 431b is made of a soft magnetic material, and forms a square-u-shape channel when viewed from the second direction y. The first position-detecting and driving magnet 411b, the first driving coil 31a, and the horizontal hall element hh10 are inside the channel of the first position-detecting and driving yoke 431b.

The side of the first position-detecting and driving yoke 431b, which contacts the first position-detecting and driving magnet 411b, prevents the magnetic-field of the first position-detecting and driving magnet 411b from leaking to the surroundings.

The other side of the first position-detecting and driving yoke 431b (which faces the first position-detecting and driving magnet 411b, the first driving coil 31a, and the movable circuit board 490a) raises the magnetic-flux density between the first position-detecting and driving magnet 411b and the first driving coil 31a, and between the first position-detecting and driving magnet 411b and the horizontal hall element hh10.

The second position-detecting and driving yoke 432b is made of a soft magnetic material, and forms a square-u-shape channel when viewed from the first direction x. The second position-detecting and driving magnet 412b, the second driving coil 32a, and the vertical hall element hv10 are inside the channel of the second position-detecting and driving yoke 432b.

The side of the second position-detecting and driving yoke 432b, which contacts the second position-detecting and driving magnet 412b, prevents the magnetic-field of the second position-detecting and driving magnet 412b from leaking to the surroundings.

The other side of the second position-detecting and driving yoke 432b (which faces the second position-detecting and driving magnet 412b, the second driving coil 32a, and the movable circuit board 490a) raises the magnetic-flux density between the second position-detecting and driving magnet 412b and the second driving coil 32a, and between the second position-detecting and driving magnet 412b and the vertical hall element hv10.

The hall element unit 440a is a one-axis hall element which has two hall elements that are magnetoelectric converting elements (magnetic-field change-detecting elements) using the Hall Effect. The hall element unit 440a detects the first detected-position signal px which is used for specifying the first location in the first direction x for the present position P of the movable unit 300a, and the second detected-position signal py which is used for specifying the second location in the second direction y for the present position P of the movable unit 300a.

One of the two hall elements is a horizontal hall element hh10 for detecting the first location in the first direction x of the movable unit 300a, so that the other is a vertical hall element hv10 for detecting the second location in the second direction y of the movable unit 300a (see FIG. 16).

The horizontal hall element hh10 is attached to the movable circuit board 490a of the movable unit 300a, under the condition where the horizontal hall element hh10 faces the first position-detecting and driving magnet 411b of the fixed unit 300b, in the third direction z.

The vertical hall element hv10 is attached to the movable circuit board 490a of the movable unit 300a, under the condition where the vertical hall element hv10 faces the second position-detecting and driving magnet 412b of the fixed unit 300b, in the third direction z.

The base board 65b is a plate state member which becomes the base for attaching the first position-detecting and driving yoke 431b etc., and is arranged being parallel to the imaging surface of the imaging device 39a1.

In the second embodiment, the base board 65b is arranged at the side nearer to the camera lens 67 in comparison with the movable circuit board 490a, in the third direction z. However, the movable circuit board 490a may be arranged at the side nearer to the camera lens 67 in comparison with the base board 65b. In this case, the first and second driving coils 31a and 32a, and the hall element unit 440a are arranged on the opposite side of the movable circuit board 490a to the camera lens 67, so that the first and second position-detecting and driving magnets 411b and 412b are arranged on the same side of the base board 65b as the camera lens 67.

The hall-element signal-processing unit 450 has a first hall-element signal-processing circuit 4501 and a second hall-element signal-processing circuit 4502.

The first hall-element signal-processing circuit 4501 detects a horizontal potential-difference x10 between output terminals of the horizontal hall element hh10, based on an output signal of the horizontal hall element hh10.

The first hall-element signal-processing circuit 4501 outputs the first detected-position signal px, which specifies the first location in the first direction x of the movable unit 300a, to the A/D converter A/D 2 of the CPU 21, on the basis of the horizontal potential-difference X10.

The second hall-element signal-processing circuit 4502 detects a vertical potential-difference y10 between output terminals of the vertical hall element hv10, based on an output signal of the vertical hall element hv10.

The second hall-element signal-processing circuit 4502 outputs the second detected-position signal py, which specifies the second location in the second direction y of the movable unit 300a, to the A/D converter A/D 3 of the CPU 21, on the basis of the vertical potential-difference Y10.

A first voltage XVf, corresponding to the optimized horizontal hall-element current-value xDi, is applied to the circuit 4560 of the first hall-element signal-processing unit 4501, from the D/A converter D/A 0 of the CPU 21.

A second voltage YVf, corresponding to the optimized vertical hall-element current-value yDi, is applied to the circuit 4660 of the second hall-element signal-processing unit 4502, from the D/A converter D/A 1 of the CPU 21.

Figure 18:
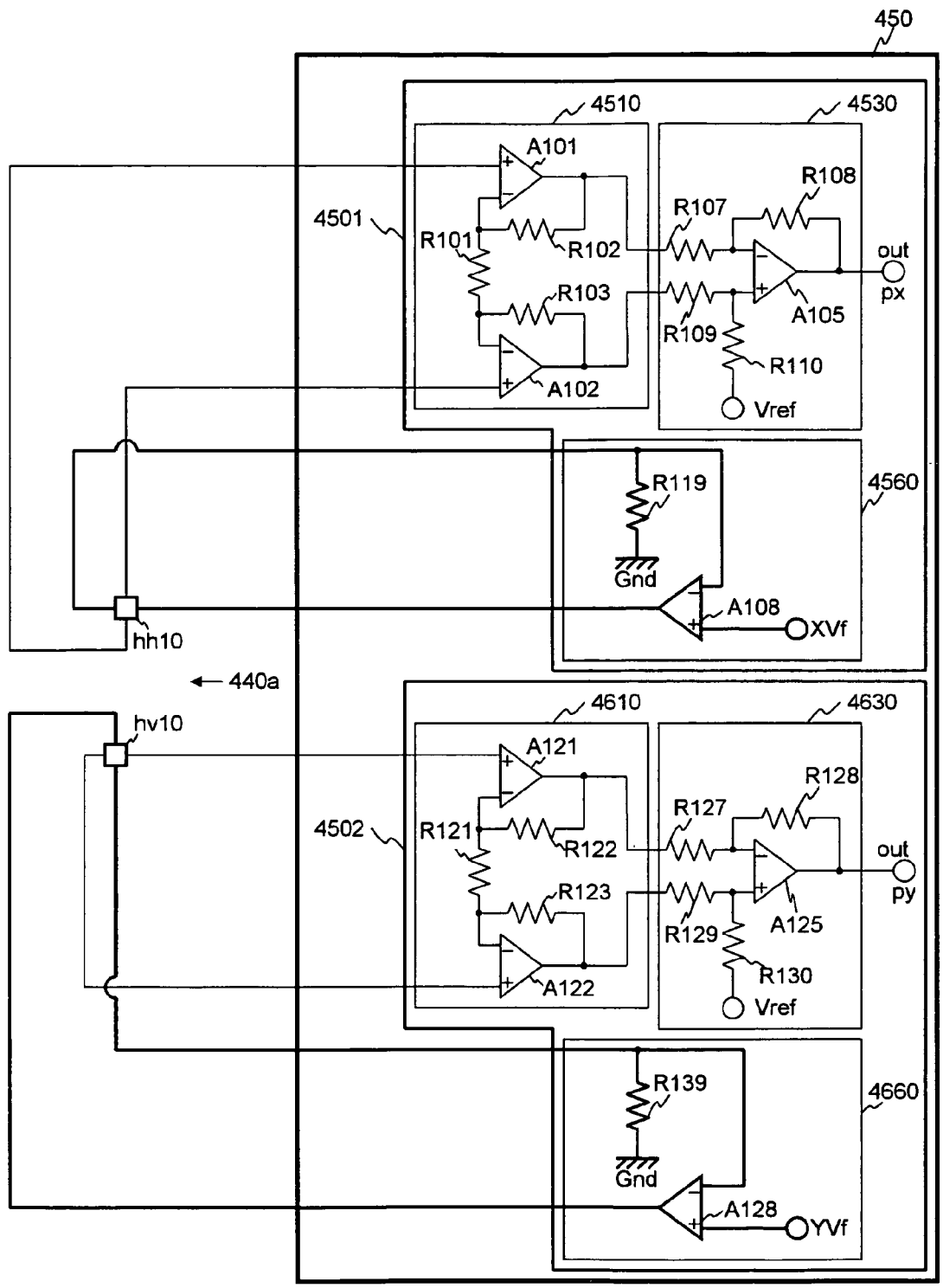
FIG. 18 is a circuit construction diagram of the circuit for the one-axis hall element and the hall-element signal-processing circuit, in the second embodiment.

The circuit construction regarding input/output signals of the horizontal hall element hh10, in the first hall-element signal-processing circuit 4501 of the hall-element signal-processing unit 450, and the circuit construction regarding input/output signals of the vertical hall element hv10, in the second hall-element signal-processing circuit 4502 of the hall-element signal-processing unit 450 are explained using FIG. 18.

The first hall-element signal-processing circuit 4501 has a circuit 4510 and a circuit 4530 for controlling the output of the horizontal hall element hh10, and has a circuit 4560 for controlling the input of the horizontal hall element hh10.

The second hall-element signal-processing circuit 4502 has a circuit 4610 and a circuit 4630 for controlling the output of the vertical hall element hv10, and has a circuit 4660 for controlling the input of the vertical hall element hv10.

Both output terminals of the horizontal hall element hh10 are connected with the circuit 4510, so that the circuit 4510 is connected with the circuit 4530.

The circuit 4510 is a differential amplifier circuit which amplifies the signal difference between the output terminals of the horizontal hall element hh10.

The circuit 4530 is a subtracting amplifier circuit which calculates the horizontal potential-difference x10 (the hall output voltage) on the basis of the difference between the amplified signal difference from the circuit 4510 and a reference voltage Vref, and which calculates the first detected-position signal px by multiplying a first amplification rate AA1 by the horizontal potential-difference The circuit 4510 has a resistor R101, a resistor R102, a resistor R103, an operational amplifier A101, and an operational amplifier A102, similar to the circuit 451 in the first embodiment. The operational amplifier A101 has an inverting input terminal, a non-inverting input terminal, and an output terminal. The operational amplifier A102 has an inverting input terminal, a non-inverting input terminal, and an output terminal.

One of the output terminals of the horizontal hall element hh10 is connected with the non-inverting input terminal of the operational amplifier A101, so that the other terminal of the horizontal hall element hh10 is connected with the non-inverting input terminal of the operational amplifier A102.

The inverting input terminal of the operational amplifier A101 is connected with the resistors R101 and R102, so that the inverting input terminal of the operational amplifier A102 is connected with the resistors R101 and R103.

The output terminal of the operational amplifier A101 is connected with the resistor R102 and the resistor R107 in the circuit 4530. The output terminal of the operational amplifier A102 is connected with the resistor R103 and the resistor R109 in the circuit 4530.

The circuit 4510 has a resistor R101, a resistor R102, a resistor R103, an operational amplifier A101, and an operational amplifier A102, similar to the circuit 451 in the first embodiment. The operational amplifier A101 has an inverting input terminal, a non-inverting input terminal, and an output terminal. The operational amplifier A102 has an inverting input terminal, a non-inverting input terminal, and an output terminal.

One of the output terminals of the horizontal hall element hh10 is connected with the non-inverting input terminal of the operational amplifier A101, so that the other terminal of the horizontal hall element hh10 is connected with the non-inverting input terminal of the operational amplifier A102.

The inverting input terminal of the operational amplifier A101 is connected with the resistors R101 and R102, so that the inverting input terminal of the operational amplifier A102 is connected with the resistors R101 and R103.

The output terminal of the operational amplifier A101 is connected with the resistor R102 and the resistor R107 in the circuit 4530. The output terminal of the operational amplifier A102 is connected with the resistor R103 and the resistor R109 in the circuit 4530.

The circuit 4530 has a resistor R107, a resistor R108, a resistor R109, a resistor R110, and an operational amplifier A105, similar to the circuit 453 in the first embodiment. The operational amplifier A105 has an inverting input terminal, a non-inverting input terminal, and an output terminal.

The inverting input terminal of the operational amplifier A105 is connected with the resistors R107 and R108. The non-inverting input terminal of the operational amplifier A105 is connected with the resistors R109 and R110. The output terminal of the operational amplifier A105 is connected with the resistor R108. The first detected-position signal px, which is obtained by multiplying the first amplification rate AA1, by the horizontal potential-difference x10, is output from the output terminal of the operational amplifier A105. One of the terminals of the resistor R110 is connected with the power supply whose voltage is the reference voltage Vref.

The values of the resistors R102 and R103 are the same. The values of the resistors R107 and R109 are the same. The values of the resistors R108 and R110 are the same.

The first amplification rate AA1 is based on the values of the resistors R107~R110 (the ratio of the value of the resistor R107 to the value of the resistor R108).

The operational amplifiers A101 and A102 are the same type of amplifier.

The circuit 4560 has a resistor R119 and an operational amplifier A108, similar to the circuit 456 in the first embodiment. The operational amplifier A108 has an inverting input terminal, a non-inverting input terminal, and an output terminal.

The inverting input terminal of the operational amplifier A108 is connected with the resistor R119 and one of the input terminals of the horizontal hall element hh10. The potential of the non-inverting input terminal of the operational amplifier A108 is set at the first voltage XVf corresponding to the current having the optimized horizontal hall-element current-value xDi, that flows through the input terminals of the horizontal hall element hh10. The value of the first voltage XVf is obtained by multiplying the optimized horizontal hall-element current-value xDi by the value of the resistor R119.

The output terminal of the operational amplifier A108 is connected with the other input terminal of the horizontal hall element hh10. One of the terminals of the resistor R119 is grounded.

Both output terminals of the vertical hall element hv10 are connected with the circuit 4610, so that the circuit 4610 is connected with the circuit 4630.

The circuit 4610 is a differential amplifier circuit which amplifies the signal difference between the output terminals of the vertical hall element hv10.

The circuit 4630 is a subtracting amplifier circuit which calculates the vertical potential-difference y10 (the hall output voltage) on the basis of the difference between the amplified signal difference from the circuit 4610 and a reference voltage Vref, and which calculates the second detected-position signal py by multiplying a second amplification rate AA2 by the vertical potential-difference y10.

The circuit 4610 has a resistor R121, a resistor R122, a resistor R123, an operational amplifier A121, and an operational amplifier A122, similar to the circuit 461 in the first embodiment. The operational amplifier A121 has an inverting input terminal, a non-inverting input terminal, and an output terminal. The operational amplifier A122 has an inverting input terminal, a non-inverting input terminal, and an output terminal.

One of the output terminals of the vertical hall element hv10 is connected with the non-inverting input terminal of the operational amplifier A121, so that the other terminal of the vertical hall element hv10 is connected with the non-inverting input terminal of the operational amplifier A122.

The inverting input terminal of the operational amplifier A121 is connected with the resistors R121 and R122, so that the inverting input terminal of the operational amplifier A122 is connected with the resistors R121 and R123.

The output terminal of the operational amplifier A121 is connected with the resistor R122 and the resistor R127 in the circuit 4630. The output terminal of the operational amplifier A122 is connected with the resistor R123 and the resistor R129 in the circuit 4630.

The circuit 4630 has a resistor R127, a resistor R128, a resistor R129, a resistor R130, and an operational amplifier A125, similar to the circuit 463 in the first embodiment. The operational amplifier A125 has an inverting input terminal, a non-inverting input terminal, and an output terminal.

The inverting input terminal of the operational amplifier A125 is connected with the resistors R127 and R128. The non-inverting input terminal of the operational amplifier A125 is connected with the resistors R129 and R130. The output terminal of the operational amplifier A125 is connected with the resistor R128. The second detected-position signal py, which is obtained by multiplying the second amplification rate AA2, by the vertical potential-difference y10, is output from the output terminal of the operational amplifier A125. One of the terminals of the resistor R130 is connected with the power supply whose voltage is the reference voltage Vref.

The values of the resistors R122 and R123 are the same. The values of the resistors R127 and R129 are the same. The values of the resistors R128 and R130 are the same.

The second amplification rate AA2 is based on the values of the resistors R127 R130 (the ratio of the value of the resistor R127 to the value of the resistor R128).

The operational amplifiers A121 and A122 are the same type of amplifier.

The circuit 4660 has a resistor R139 and an operational amplifier A128, similar to the circuit 466 in the first embodiment. The operational amplifier A128 has an inverting input terminal, a non-inverting input terminal, and an output terminal.

The inverting input terminal of the operational amplifier A128 is connected with the resistor R139 and one of the input terminals of the vertical hall element hv10. The potential of the non-inverting input terminal of the operational amplifier A128 is set at the second voltage YVf corresponding to the current having the optimized vertical hall-element current-value yDi, that flows through the input terminals of the vertical hall element hv10. The value of the second voltage YVf is obtained by multiplying the optimized vertical hall-element current-value yDi by the value of the resistor R139.

The output terminal of the operational amplifier A128 is connected with the other input terminal of the vertical hall element hv10. One of the terminals of the resistor R139 is grounded.

The other constructions in the second embodiment are the same as those in the first embodiment.

In the initial-adjustment operation of the second embodiment, the values of the first and second amplification rates AA1 and AA2 are fixed (not changed), so that the first initial-adjustment operation which changes the value of the current which flows through the input terminals of the horizontal hall element hh10, and the second initial-adjustment operation which changes the value of the current which flows through the input terminals of the vertical hall element hv10, are performed.

Specifically, in the first initial-adjustment operation in the second embodiment, the value of the current (the fist horizontal hall-element current-value xDi1) which flows through the input terminals of the horizontal hall element hh10, is adjusted, where the output value of the first detected-position signal px is the same as the maximum value in the A/D converting range of the A/D converter A/D 2 of the CPU 21, when the center of the movable unit 300a contacts the first horizontal edge-point rx11.

Next, the value of the current (the second horizontal hall-element current-value xDi2) which flows through the input terminals of the horizontal hall element hh10, is adjusted, where the output value of the first detected-position signal px is the same as the minimum value in the A/D converting range of the A/D converter A/D 2 of the CPU 21, when the center of the movable unit 300a contacts the second horizontal edge-point rx12.

Next, it is judged whether the first horizontal hall-element current-value xDi1 is larger than the second horizontal hall-element current-value xDi2, so that the optimized horizontal hall-element current-value xDi which is the smaller value of the first and second horizontal hall-element current-values xDi1 and xDi2, is determined and stored in the memory unit 72.

Similarly, in the second initial-adjustment operation in the second embodiment, the value of the current (the first vertical hall-element current-value yDi1) which flows through the input terminals of the vertical hall element hv10, is adjusted, where the output value of the second detected-position signal py is the same as the maximum value in the A/D converting range of the A/D converter A/D 3 of the CPU 21, when the center of the movable unit 300a contacts the first vertical edge-point ry11.

Next, the value of the current (the second vertical hall-element current-value yDi2) which flows through the input terminals of the vertical hall element hv10, is adjusted where the output value of the second detected-position signal py is the same as the minimum value in the A/D converting range of the A/D converter A/D 3 of the CPU 21, when the center of the movable unit 300a contacts the second vertical edge-point ry12.

Next, it is judged whether the first vertical hall-element current-value yDi1 is larger than the second horizontal hall-element current-value yDi2, so that the optimized vertical hall-element current-value yDi which is the smaller value of the first and second vertical hall-element current-values yDi1 and yDi2, is determined and stored in the memory unit 72.

Accordingly, the first initial-adjustment operation is composed of an electrical adjustment which adjusts the value of the current which flows through the input terminals of the horizontal hall element hh10 (not a mechanical adjustment). Similarly, the second initial-adjustment operation is composed of an electrical adjustment which adjusts the value of the current which flows through the input terminals of the vertical hall-element hv10 (not a mechanical adjustment). Therefore, usability can be improved in comparison with when the initial-adjustment operation includes a mechanical adjustment for adjusting the values of the resistors etc., similar to the first embodiment.

Further, because the optimized horizontal and optimized vertical hall-element current-values xDi and yDi are stored in the memory unit 72, these values are not deleted even if the photographing apparatus 1 (the memory unit 72) is set to the off state (power off). Accordingly, the first and second initial-adjustment operations may be performed only one time, in order for the CPU 21 to read the optimized horizontal and optimized vertical hall-element current-values xDi and yDi.

In the second embodiment, the first position-detecting and driving magnet 411b is one body in order to detect the first location in the first direction x of the movable unit 300a, and drive the movable unit 300a in the first direction x. However a magnet for detecting the first location and a magnet for driving the movable unit 300a in the first direction x, may be separated.

Similarly, the second position-detecting and driving magnet 412b is one body in order to detect the second location in the second direction y of the movable unit 300a, and drive the movable unit 300a in the second direction y. However a magnet for detecting the second location and a magnet for driving the movable unit 300a in the second direction y, may be separated.

Further, it is explained that the hall element unit 440a is attached to the movable unit 300a and the position-detecting magnets (the first and second position-detecting and driving magnets 411b and 412b) are attached to the fixed unit 300b, however the hall element unit may be attached to the fixed unit and position-detecting magnets may be attached to the movable unit.

In the first and second embodiments, the magnet which generates a magnetic-field, may be a permanent magnet which always generates the magnetic-field, or an electric magnet which generates the magnetic-field when it is needed.

Further, it is explained that the movable unit 30a (300a) has the imaging device 39a1. However, the movable unit 30a (300a) may have a hand-shake correcting lens instead of the imaging device.

Further, it is explained that the hall element is used for position-detecting as the magnetic-field change-detecting element, however, another detecting element may be used for position-detecting. Specifically, the detecting element may be an MI (Magnetic Impedance) sensor, in other words a high-frequency carrier-type magnetic-field sensor, or a magnetic resonance-type magnetic-field detecting element, or an MR (Magneto-Resistance effect) element. When one of the MI sensor, the magnetic resonance-type magnetic-field detecting element, and the MR element is used, the information regarding the position of the movable unit can be obtained by detecting the magnetic-field change, similar to using the hall element.

Further, in the first and second embodiments, the movable unit 30a (300a) is movable in the first direction x and the second direction y, relative to the fixed unit 30b (300b), so that the position-detecting operation is performed by detecting the position of the movable unit in the first direction x (the first location), and in the second direction y (the second location). However, any other methods (or means) for moving the movable unit 30a (300a) on a plane which is perpendicular to the third direction z (the optical axis LX), and for detecting the movable unit 30a (300a) on the plane, are acceptable.

For example, the movement of the movable unit may only be in one dimension, so that the movable unit can be moved only in the first direction x (not the second direction y). In this case, the parts regarding the movement of the movable unit in the second direction y and regarding the position-detecting operation of the movable unit in the second direction y, such as the vertical hall element hv10 etc., may be omitted (see FIG. 16 etc.).

Further, it is explained that the value of the current flowing through the hall element (the magnetic-field change-detecting element), is changed, in the initial-adjustment operation. However, by changing the value of the control-signal for driving the hall element (the magnetic-field change-detecting element), the initial adjustment operation may be performed.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2004-064041 (filed on Mar. 8, 2004), which is expressly incorporated herein by reference, in its entirety.

The invention claimed is:

1. An anti-shake apparatus of a photographing apparatus, comprising:

a movable unit that has one of an imaging device and a hand-shake correcting lens, and that can be moved in first and second directions, said first direction being perpendicular to an optical axis of a camera lens of said photographing apparatus, and said second direction being perpendicular to said optical axis and said first direction;

a fixed unit that slidably supports said movable unit in both said first and second directions;

a signal-processing unit; and a control unit that controls said movable unit, said fixed unit, and said signal-processing unit, and that has first and second A/D converters;

one of said movable unit and said fixed unit having a magnetic-field change-detecting unit which has a horizontal magnetic-field change-detecting element for detecting a position of said movable unit in said first direction as a first location, and a vertical magnetic-field change-detecting element for detecting a position of said movable unit in said second direction as a second location;

another of said movable unit and said fixed unit having a position-detecting magnet which is used for detecting said first and second locations, and which faces said magnetic-field change-detecting unit;

said signal-processing unit outputting a first detected-position signal, which specifies said first location on the basis of output signals of said horizontal magnetic-field change-detecting element, to said first A/D converter, and outputting a second detected-position signal, which specifies said second location on the basis of output signals of said vertical magnetic-field change-detecting element, to said second A/D converter;

said control unit calculating said first location on the basis of an A/D converting operation by said first A/D converter, for said first detected-position signal, and calculating said second location on the basis of an A/D converting operation by said second A/D converter, for said second detected-position signal;

an optimized horizontal current-value being calculated in a first initial-adjustment operation which adjusts a first detecting-resolution when said first detected-position signal is A/D converted by said first A/D converter, by changing the value of the current which flows through the input terminals of said horizontal magnetic-field change-detecting element;

current having said optimized horizontal current-value, flowing through the input terminals of said horizontal magnetic-field change-detecting element when detecting the position of said movable unit;

an optimized vertical current-value being calculated in a second initial-adjustment operation which adjusts a second detecting-resolution when said second detected-position signal is A/D converted by said second A/D converter, by changing the value of the current which flows through the input terminals of said vertical magnetic-field change-detecting element; and current having said optimized vertical current-value, flowing through the input terminals of said vertical magnetic-field change-detecting element when detecting the position of said movable unit.

2. The anti-shake apparatus according to claim 1, wherein said optimized horizontal current-value is the smaller value of first and second horizontal current-values;

said optimized vertical current-value is the smaller value of first and second vertical current-values;

said first horizontal current-value is the value of the current which flows through said input terminals of said horizontal magnetic-field change-detecting element, under the condition where the output value of said first detected-position signal is the same as the maximum value in the A/D converting range of said first A/D converter, when said movable unit contacts a first horizontal edge-point which is one of the edge-points in a movement range of said movable unit in said first direction;

said second horizontal current-value is the value of the current which flows through said input terminals of said horizontal magnetic-field change-detecting element, under the condition where the output value of said first detected-position signal is the same as the minimum value in the A/D converting range of said first A/D converter, when said movable unit contacts a second horizontal edge-point which is another of the edge-points in said movement range of said movable unit in said first direction;

said first vertical current-value is the value of the current which flows through said input terminals of said vertical magnetic-field change-detecting element, under the condition where the output value of said second detected-position signal is the same as the maximum value in the A/D converting range of said second A/D converter, when said movable unit contacts a first vertical edge-point which is one of the edge-points in a movement range of said movable unit in said second direction; and said second vertical current-value is the value of the current which flows said input terminals of said vertical magnetic-field change-detecting element, under the condition where the output value of said second detected-position signal is the same as the minimum value in the A/D converting range of said second A/D converter, when said movable unit contacts a second vertical edge-point which is another of the edge-points in said movement range of said movable unit in said second direction.

3. The anti-shake apparatus according to claim 1, wherein said fixed unit has said magnetic-field change-detecting unit;

said movable unit has said position-detecting magnet; and said magnetic-field change detecting unit has first and second horizontal magnetic-field change-detecting elements whose input terminals are connected in series, as said horizontal magnetic-field change-detecting element, and has first and second vertical magnetic-field change-detecting elements whose input terminals are connected in series, as said vertical magnetic-field change-detecting element.

4. The anti-shake apparatus according to claim 3, wherein said position-detecting magnet has a front-surface, which faces said magnetic-field change-detecting unit and which is a square having peripheral sides which are parallel to one of said first direction and said second direction; and said position-detecting magnet has an N pole and an S pole, which are arranged in a third direction being parallel to said optical axis.

5. The anti-shake apparatus according to claim 4, wherein when the center of one of said imaging device and said handshake correcting lens which is included in said movable unit, passes through said optical axis, said first horizontal magnetic-field change-detecting element is located at a place which faces midway along a side of said square front-surface, in said second direction, of said position-detecting magnet; said second horizontal magnetic-field change-detecting element is located at a place which faces midway along another side of said square front-surface, in said second direction, of said position-detecting magnet; said first vertical magnetic-field change-detecting element is located at a place which faces midway along a side of said square front-surface, in said first direction, of said position-detecting magnet;

and said second vertical magnetic-field change-detecting element is located at a place which faces midway along another side of said square front-surface, in said first direction, of said position-detecting magnet.

6. The anti-shake apparatus according to claim 3, wherein said magnetic-field change-detecting unit is a two-axes hall element; and said first and second horizontal magnetic-field change-detecting elements, and said first and second vertical magnetic-field change-detecting elements are hall elements.

7. The anti-shake apparatus according to claim 1, wherein said movable unit has said magnetic-field change-detecting unit;

said fixed unit has said position-detecting magnet;

said magnetic-field change-detecting unit has one said horizontal magnetic-field change-detecting element and one said vertical magnetic-field change-detecting element; and said position-detecting magnet has a first position-detecting magnet which is used for detecting said first location and faces said horizontal magnetic-field change-detecting element, and a second position-detecting magnet which is used for detecting said second location and faces said vertical magnetic-field change-detecting element.

8. The anti-shake apparatus according to claim 7, wherein said movable unit has a first driving coil which is used for moving said movable unit in said first direction, and a second driving coil which is used for moving said movable unit in said second direction;

said first position-detecting magnet is used for moving said movable unit in said first direction; and said second position-detecting magnet is used for moving said movable unit in said second direction.

9. The anti-shake apparatus according to claim 7, wherein said magnetic-field change-detecting unit is a one-axis hall element; and said horizontal magnetic-field change-detecting element and said vertical magnetic-field change-detecting element are hall elements.

10. The anti-shake apparatus according to claim 1, wherein said movable unit has said position-detecting magnet;

said fixed unit has said magnetic-field change-detecting unit;

said magnetic-field change-detecting unit has one said horizontal magnetic-field change-detecting element and one said vertical magnetic-field change-detecting element; and said position-detecting magnet has a first position-detecting magnet whose N pole and S pole are arranged in said first direction and which faces said horizontal magnetic-field change-detecting element, and a second position-detecting magnet whose N pole and S pole are arranged in said second direction and which faces said vertical magnetic-field change-detecting element.

11. The anti-shake apparatus according to claim 1, further comprising a memory unit that is connected with said control unit, and stores said optimized horizontal current-value and said optimized vertical current-value;
a content which is stored in said memory unit is not deleted even if said memory unit is set to the off state.

12. The anti-shake apparatus according to claim 1, wherein when the center area of one of said imaging device and said hand-shake correcting lens which is included in said movable unit, is located on said optical axis, the location relation between said movable unit and said fixed unit is set up so that said movable unit is located at the center of its movement range in both said first direction and said second direction.

13. A method for adjusting a detecting-resolution when ALD converting in an anti-shake apparatus of a photographing apparatus according to claim 1, comprising:
calculating a first horizontal current-value;
calculating a second horizontal current-value;
calculating a first vertical current-value;
calculating a second vertical current-value; and
calculating said optimized horizontal current-value on the basis of said first and second horizontal current-values, and said optimized vertical current-value on the basis of said first and second vertical current-values;
said optimized horizontal current-value being the smaller value of said first and second horizontal current-values;
said optimized vertical current-value being the smaller value of said first and second vertical current-values;
said first horizontal current-value being the value of the current which flows through said input terminals of said horizontal magnetic-field change-detecting element, under the condition where the output value of said first detected-position signal is the same as the maximum value in the A/D converting range of said first A/D converter, when said movable unit contacts a first horizontal edge-point which is one of the edge-points in a movement range of said movable unit, in said first direction;
said second horizontal current-value being the value of the current which flows through said input terminals of said horizontal magnetic-field change-detecting element, under the condition where the output value of said first detected-position signal is the same as the minimum value in the A/D converting range of said first A/D converter, when said movable unit contacts a second horizontal edge-point which is another of the edge-points in said movement range of said movable unit, in said first direction;
said first vertical current-value being the value of the current which flows through said input terminals of said vertical magnetic-field change-detecting element, under the condition where the output value of said second detected-position signal is the same as the maximum value in the A/D converting range of said second A/D converter, when said movable unit contacts a first vertical edge-point which is one of the edge-points in a movement range of said movable unit, in said second direction; and
said second vertical current-value being the value of the current which flows through said input terminals of said vertical magnetic-field change-detecting element, under the condition where the output value of said second detected-position signal is the same as the minimum value in the A/D converting range of said second A/D converter, when said movable unit contacts a second vertical edge-point which is another of the edge-points in said movement range of said movable unit in said second direction.

14. The method according to claim 13, further comprising storing said optimized horizontal current-value and said optimized vertical current-value in a memory unit of said photographing apparatus;
a content which is stored in said memory unit is not deleted even if said memory unit is set to the off state.

15. A method for adjusting a detecting-resolution when A/D converting in an anti-shake apparatus of a photographing apparatus which has a movable unit, a fixed unit, a signal-processing unit, and a control unit; said movable unit having one of an imaging device and a hand-shake correcting lens, and being able to be moved on a plane which is perpendicular to an optical axis of a camera lens of said photographing apparatus; said fixed unit supporting said movable unit so as to be movable on said plane; one of said movable unit and said fixed unit having a magnetic-field change-detecting unit for detecting a position of said movable unit on said plane; said signal-processing unit outputting a detected-position signal, which specifies said position, on the basis of output signals of said magnetic-field change-detecting unit, to an A/D converter of said control unit; and said control unit calculating said position on the basis of an A/D converting operation by said A/D converter, for said detected-position signal, comprising:
calculating a first current-value;
calculating a second current-value; and
calculating an optimized current-value on the basis of said first and second current-values;
said optimized current-value being the smaller value of said first and second current-values;
current having said optimized current-value flowing through said magnetic-field change-detecting unit when detecting said position;
said first current-value being the value of the current which flows through said magnetic-field change-detecting unit, under the condition where the output value of said detected-position signal is the same as the maximum value in the A/D converting range of said A/D converter, when said movable unit contacts a first edge-point which is one of the edge-points in a movement range of said movable unit; and
said second current-value being the value of the current which flows through said magnetic-field change-detecting unit, under the condition where the output value of said detected-position signal is the same as the minimum value in the A/D converting range of said A/D converter, when said movable unit contacts a second edge-point which is another of the edge-points in said movement range of said movable unit.

* * * * *